(12) United States Patent
Wu et al.

(10) Patent No.: US 11,420,743 B2
(45) Date of Patent: Aug. 23, 2022

(54) WINDPROOF AERIAL DISPENSING METHOD AND SYSTEM

(71) Applicant: SZ DJI TECHNOLOGY CO., LTD., Shenzhen (CN)

(72) Inventors: Xumin Wu, Shenzhen (CN); Guang Yan, Shenzhen (CN); Zhuang Feng, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 403 days.

(21) Appl. No.: 16/557,304

(22) Filed: Aug. 30, 2019

(65) Prior Publication Data

US 2020/0017215 A1     Jan. 16, 2020

Related U.S. Application Data

(63) Continuation of application No. PCT/CN2017/075630, filed on Mar. 3, 2017.

(51) Int. Cl.
*B64D 1/18* (2006.01)
*B64C 39/02* (2006.01)

(52) U.S. Cl.
CPC .............. *B64D 1/18* (2013.01); *B64C 39/024* (2013.01); *B64C 2201/12* (2013.01); *B64C 2201/141* (2013.01)

(58) Field of Classification Search
CPC ...................................................... B64D 1/18
See application file for complete search history.

(56) References Cited

U.S. PATENT DOCUMENTS

| | | | |
|---|---|---|---|
| 2007/0145191 A1 | 6/2007 | Smith et al. | |
| 2015/0274294 A1* | 10/2015 | Dahlstrom | .......... B05B 13/0278 239/722 |
| 2018/0319499 A1* | 11/2018 | Holly | ................... G05D 7/0617 |
| 2019/0366375 A1* | 12/2019 | Thompson | ............ B64C 39/024 |

FOREIGN PATENT DOCUMENTS

| | | | | |
|---|---|---|---|---|
| CN | 104401492 | A | 3/2015 | |
| CN | 104459193 | A | 3/2015 | |
| CN | 204236779 | U | 4/2015 | |
| CN | 105292480 | A | 2/2016 | |
| CN | 105539851 | A | 5/2016 | |
| CN | 105923161 | A | 9/2016 | |
| CN | 205770168 | U | 12/2016 | |
| CN | 106275445 | A | 1/2017 | |
| CN | 106347666 | A | 1/2017 | |
| CN | 105292480 | B | 12/2017 | |
| CN | 207157497 | U * | 3/2018 | ............. B64C 11/00 |

(Continued)

OTHER PUBLICATIONS

The World Intellectual Property Organization (WIPO) International Search Report and and Written Opinion for PCT/CN2017/075630 dated Nov. 30, 2017 8 pages.

*Primary Examiner* — Richard R. Green
*Assistant Examiner* — William L Gmoser
(74) *Attorney, Agent, or Firm* — Anova Law Group, PLLC

(57) ABSTRACT

An aerial dispensing method includes obtaining a wind velocity of a wind that causes a drift to a substance dispensed from an unmanned aerial vehicle (UAV), and controlling one or more components of the UAV based on the obtained wind velocity to cause at least mitigation to the drift.

20 Claims, 11 Drawing Sheets

(56) References Cited

FOREIGN PATENT DOCUMENTS

| | | |
|---|---|---|
| CN | 106347666 B | 1/2019 |
| CN | 105923161 B | 3/2019 |
| JP | 2005245372 A | 9/2005 |
| JP | 2006176073 A | 7/2006 |
| JP | 2007290647 A | 11/2007 |
| WO | 2013144508 A1 | 10/2013 |
| WO | 2017106903 A1 | 6/2017 |

* cited by examiner

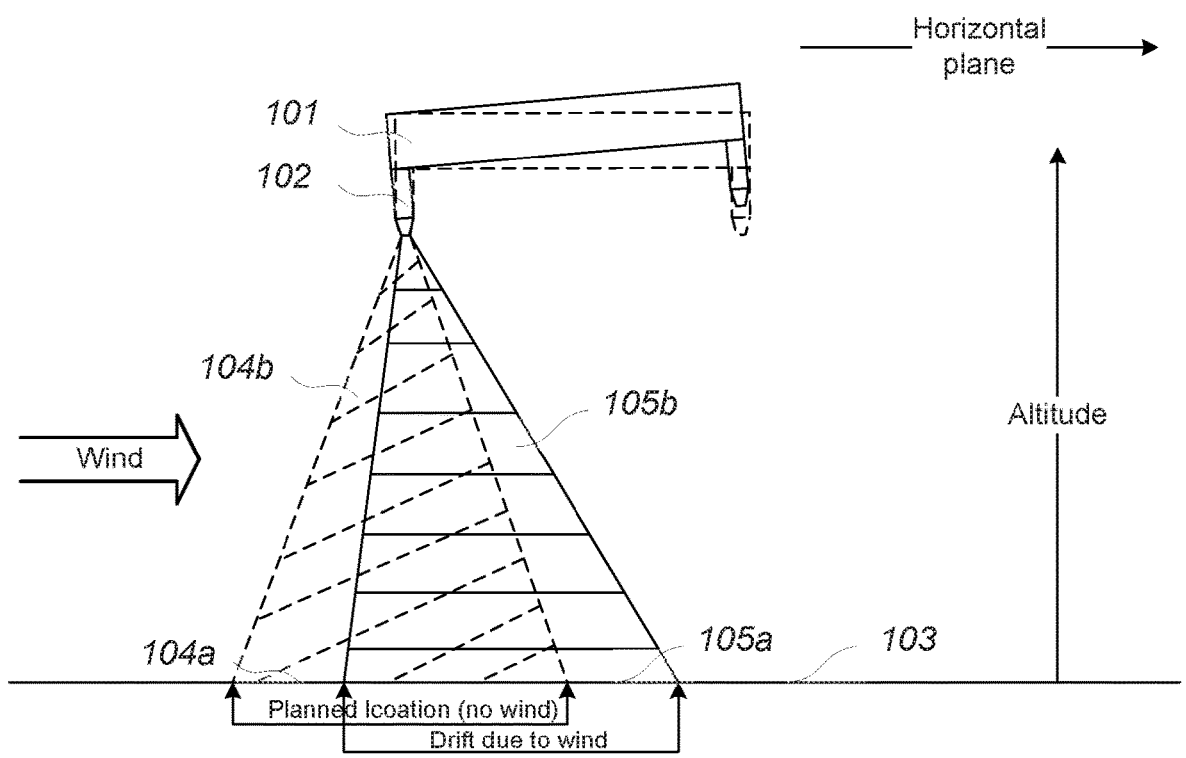
*Fig. 1A (side view)*
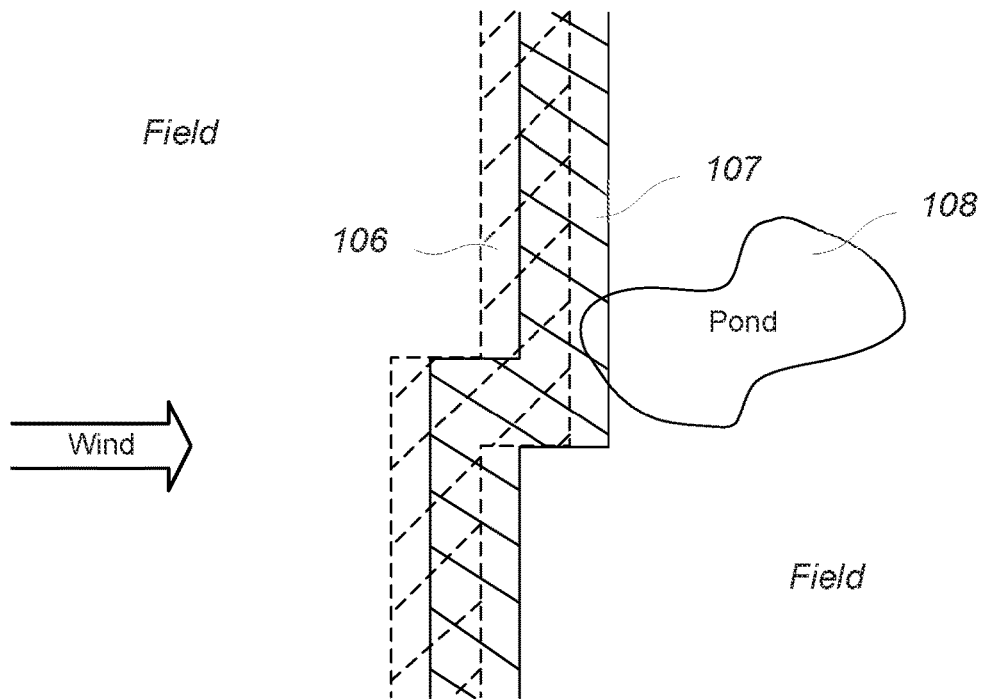
*Fig. 1B (top view)*

500

┌─────────────────────────────────┐
│ Obtain a wind velocity, the wind causing a │ ─ 501
│ drift to a substance dispensed from an │
│ unmanned aerial vehicle (UAV) │
└─────────────────────────────────┘
                │
                ▼
┌─────────────────────────────────┐
│ Control one or more components of the │ ─ 502
│ UAV based on the obtained wind velocity │
│ to cause mitigation to the drift │
└─────────────────────────────────┘

501
Obtain a wind velocity, the wind causing a drift to a substance dispensed from an unmanned aerial vehicle (UAV)

601
Determine the wind velocity based on comparing a first spatial disposition of the UAV with a second spatial disposition of the UAV, the first spatial disposition being a spatial disposition in a no-wind condition

502
Control one or more components of the UAV based on the obtained wind velocity to cause mitigation to the drift

602
Cause a movement of at least one nozzle that dispenses the substance relative to a 3D space, the movement at least partially countering the obtained wind velocity

*Fig. 6* ns or the nozzle systems and configured to control at least one of the propulsion systems or the nozzle systems based on a wind velocity, to cause at least mitigation to a drift of the substance from wind.

WINDPROOF AERIAL DISPENSING METHOD AND SYSTEM

CROSS-REFERENCE TO RELATED APPLICATION

This application is a continuation of International Application No. PCT/CN2017/075630, filed Mar. 3, 2017, the entire content of which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Unmanned aerial vehicles (UAVs) are used in aerial dispensing/spray, for example, in agriculture. Often, the dispensed substance is blown downwind while dropping towards the ground. As a result, the substance will also land downwind from the planned location. Such drift is counter-productive to the aerial dispensing operation and poses threats to the environment.

SUMMARY

One aspect of the present disclosure is directed to a visual simulation system. The system may comprise obtaining a wind velocity, the wind causing a drift to a substance dispensed from an unmanned aerial vehicle (UAV), and controlling one or more components of the UAV based on the obtained wind velocity to cause at least mitigation to the drift.

Another aspect of the present disclosure is directed to an aerial dispensing system. The system may comprise a non-transitory computer-readable memory that stores computer-executable instructions, and one or more processors. The one or more processors may be, individually or collectively, configured to access the memory and execute the computer-executable instructions to obtain a wind velocity, the wind causing a drift to a substance dispensed from a UAV, and control one or more components of the UAV based on the obtained wind velocity to cause at least mitigation to the drift.

Another aspect of the present disclosure is directed to one or more non-transitory computer-readable storage media having stored thereon executable instructions that, when executed by one or more processors of an aerial dispensing system, cause the aerial dispensing system to perform a method. The method may comprise obtaining a wind velocity, the wind causing a drift to a substance dispensed from a UAV, and controlling one or more components of the UAV based on the obtained wind velocity to cause at least mitigation to the drift.

Another aspect of the present disclosure is directed to a UAV. The UAV may comprise a frame, one or more propulsion systems mounted on the frame, one or more nozzle systems coupled to at least one of the frame or the one or more propulsion systems and configured to dispense a substance from the UAV, and one or more controllers. The one or more controllers may be coupled to at least one of the propulsion systems or the nozzle systems and configured to control at least one of the propulsion systems or the nozzle systems based on a wind velocity, to cause at least mitigation to a drift of the substance from wind.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this disclosure, illustrate several embodiments and, together with the description, serve to explain the disclosed principles.

FIGS. 1A-1B are graphical representations illustrating the wind effect to aerial dispensing, consistent with the exemplary embodiments of the present disclosure.

FIG. 5 is a flowchart illustrating a method for aerial dispensing, consistent with the exemplary embodiments of the present disclosure.

FIG. 6 is a flow chart illustrating a method for aerial dispensing, consistent with the exemplary embodiments of the present disclosure.

DETAILED DESCRIPTION

Figure 2A:
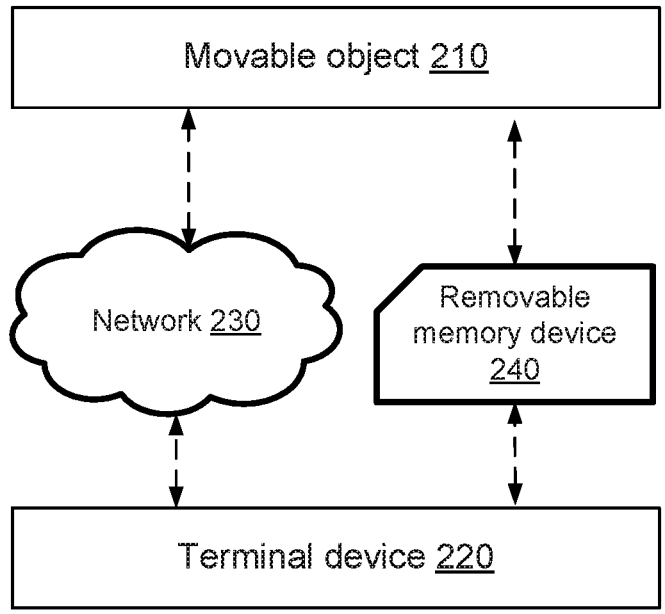
FIG. 2A is a block diagram illustrating a system for aerial dispensing, consistent with the exemplary embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. For brevity, the descriptions of components in one embodiment may be applicable to the same or similar components in a different embodiment, although different reference numbers may be used to refer the components in the different embodiment. The implementations set forth in the following description of exemplary embodiments consistent with the present disclosure do not represent all implementations consistent with the disclosure. Instead, they are merely examples of systems and methods consistent with aspects related to the disclosure.

The UAV technology has offered solutions for precious and effective farming such as aerial dispensing or other similar applications. A UAV can carry various solids (e.g., a powder, a particle, etc.) and/or liquids that need to be sprayed from the air, such as a nutrient, a fertilizer, a seed, a pesticide, a herbicide, a chemical fire extinguisher, etc. The UAV may be a fixed-wing UAV, a rotorcraft UAV, etc. The rotorcraft UAV may include a helicopter or a multi-rotary UAV. Multi-rotary UAVs can have various rotor types such as Bi-Rotor, Tri-Rotor, Quad-Rotor, Six-Rotor, etc. A nozzle of the UAV may dispense the substance during a flight. For example, a liquid substance may atomized or dispensed through size-limiting pores.

The wind poses significant problem to such operations. As the dispensed substance fall towards ground under gravity, it is also subject to the wind force. The wind will cause the substance to land downwind from the planned location. For better absorption by the crops, the dispense substance usually has to be dispensed within a limited unit size/mass, which exacerbates the wind drift.

The drift is counter-productive to the aerial dispensing and poses potential environmental threats. For example, some crops in an upwind location may not receive adequate spray, if any at all. Further, due to the chemical nature of most spray (e.g., the pesticides, herbicides, fertilizers, etc.), the drift may cause serious ecological damages to areas that become accidentally sprayed, such as ponds next to the field crops.

Such drift effect to aerial dispensing is illustrated in FIGS. 1A and 1B. Referring to FIG. 1A, an aircraft 101 takes flight above a surface 103. The aircraft 101 may comprise a nozzle 102 configured to dispense a substance from the air. In some embodiments, the aircraft 101 may assume various poses in the air in response to the wind. For example, the aircraft 101 may be configured to fly in the solid line pose when there is no wind. For another example, the aircraft 101 may be configured to fly in the dash line pose when there is wind coming from left, since such pose will generate a driving force countering the wind force. More details regarding the pose configurations are discussed below with reference to FIGS. 2A and 2B. Regardless of the pose taken and in a no-wind condition, when the aircraft 101 hovers at a certain altitude above the surface 103 and starts dispensing the substance, the dispensed substance falls toward the surface under gravity, and lands at location 104a labelled as "planned location (no wind)" in the figure. A dash-line region 104b indicates an exemplary volume traveled by the dispensed substance in the air in the no-wind condition. However, when wind blows, the dispensed substance is likely to be drift from the original trajectory, and land at location 105a, labelled as "drift due to wind" in the figure. A solid-line region 105b indicates an exemplary volume that the dispensed substance may pass through in the presence of wind. As shown in FIG. 1A, the drift to the dispensed substance can substantially shift its landing location downwind from the original landing location 105a. The original landing location is a target landing location of the dispensed substance.

FIG. 1B compares the landing locations of the dispensed substance with and without wind from a top view. In this example, the aircraft has moved across a field while dispensing a pesticide. The planned spray area is the dash-line region 106. However, due to the wind discussed above, the landing location drifts downwind to the solid-line region 107. As a result, some operating areas towards the left side of the region 106 did not receive the intended pesticide, while some non-operating areas accidentally receive the pesticide. In particular, some of the drifted pesticides landed in the pond 108 is likely to cause damages to the pond environment.

Some existing methods intend to mitigate the wind drift by switching the nozzle with another one with larger pores to dispense heavier droplets, or rescheduling the aerial dispensing to another time when the wind subsides. However, some liquid (e.g., pesticide) dispense requires a limited droplet size for effective absorption and to prevent scorching the plant. Thus, the first method is not realistic for many applications. Further, the second method cannot cure the underlying deficiency set forth above with respect to aerial farming. Missing dispenses at critical times tends to lower the crop yield.

In various implementations disclosed herein, the drift problem can be mitigated or cured by obtaining a wind velocity and changing the spatial disposition of the nozzle based on the obtained wind velocity, thus bringing the landing location of the dispensed substance to the planned spot. The wind velocity may be obtained through various methods, such as determining the wind velocity based on a UAV status (e.g., the spatial disposition of the UAV, that is, the six degree of freedom UAV position and pose measured by an inertial measurement unit on the UAV, etc.), a UAV propulsion system status (e.g., the power of a motor actuating the UAV rotors, the rotation speeds of the UAV rotors, etc.), a user entered parameter (e.g., user-defined parameters directly or indirectly input to the UAV, etc.), a wind gauge measurement (e.g., a device carried on the UAV or outside the UAV to measure the wind velocity, etc.), and the like. Further, the spatial disposition includes six degrees of freedom (e.g., x, y, and z positions and pitch, roll, and yaw angles).

To implement the spatial disposition change of the nozzle, the UAV and/or the nozzle may be controlled. Various UAV components (e.g., mechanical components, electrical components, electronic components, etc.) may be actuated to effectuate the control of the UAV and/or the nozzle. For example, the UAV may be controlled to change its spatial disposition relative to the 3D space (e.g., the real environment or living space in a 3D or an alternative coordinate system). For another example, the nozzle may be controlled to change its spatial disposition relative to the 3D space. For yet another example, the nozzle may be controlled to change its spatial disposition relative to the UAV. A persons of ordinary skill in the art would appreciate modifying and/or combining one or more of the disclosed methods to achieve similar results. In some embodiments, to effectuate the spatial disposition change of the nozzle, the flight path of the UAV may be modified based on the obtained wind. For example, referring back to FIG. 1B, shifting the flight path toward left may cause the dispensed substance to land at region 106 instead of region 107.

In some embodiments, the disclosed methods may be implemented by an aerial dispensing system. The system may comprise a non-transitory computer-readable memory that stores computer-executable instructions, and one or more processors. The one or more processors may be, individually or collectively, configured to access the memory and execute the computer-executable instructions to perform the disclosed methods. For example, the system may comprise a UAV, a controller, and/or another device. The memory and the processors may be disposed together or separately in one or more of such devices.

In some embodiments, the disclosed methods may be implemented by an aerial dispensing apparatus. The apparatus may be implemented as a UAV, a mobile device (e.g., a mobile phone, a wearable device, etc.), a controller (e.g., a remote controller of a UAV, a dock of a UAV), a computing device (e.g., a laptop), a server, etc. The disclosed methods can be implemented dynamically (e.g., with real time feedback) or statistically (e.g., according to a predetermined program). For example, the UAV may actively (e.g., determining actions by one or more components of the UAV) or passively (e.g., being controlled by the controller) change its spatial disposition, such that the dispensed substance lands in its originally planned location. The spatial disposition change may be manifested as a changed in the UAV's flight path, altitude, and/or pose, UAV nozzle's configuration, pose, and/or position, etc.

As such, the farming efficiency can increase since the fields receive adequate spray and spray accidents are at least reduced. Moreover, the aerial dispense is no longer subjected to the wind conditions and can actively self-adjust to counter these conditions. Further, no nozzle change size is needed, and the aerial dispense can be carried out at planned times.

FIG. 2A is a block diagram illustrating a system 200 for aerial dispensing, consistent with the exemplary embodiments of the present disclosure. The system 200 can be used in combination with any suitable embodiment of the systems, devices, and methods disclosed herein. The system 200 may comprise a movable object 210 and a terminal device 220, coupled through a network 230 and/or a removable memory device 240. One or more of the components of the system 200 may be optional. In some embodiments, the system 200 may include many more components than those shown in FIG. 2A. However, it is not necessary that all of these components be shown in order to disclose an illustrative embodiment. For example, the movable object 210, alone or in combination with another system or device (e.g., the terminal device 220), may implement the aerial dispensing method disclosed herein.

The network 230 may be a wire/cable-based or wireless connection (e.g., wire, radio, Bluetooth, cloud connection, 4G/LTE, WiFi, etc.) which allows data and signal transmission between the movable object 210 and the terminal device 220. The network 230 may also comprise network devices, such as cloud computers or servers configured to store or relay signals and data. Alternative to the network 230, data, files, and/or instructions may be transferred or exchanged through a removable memory device 240 (e.g., a secure digital (SD) card, a USB drive, etc.).

Figure 2B:
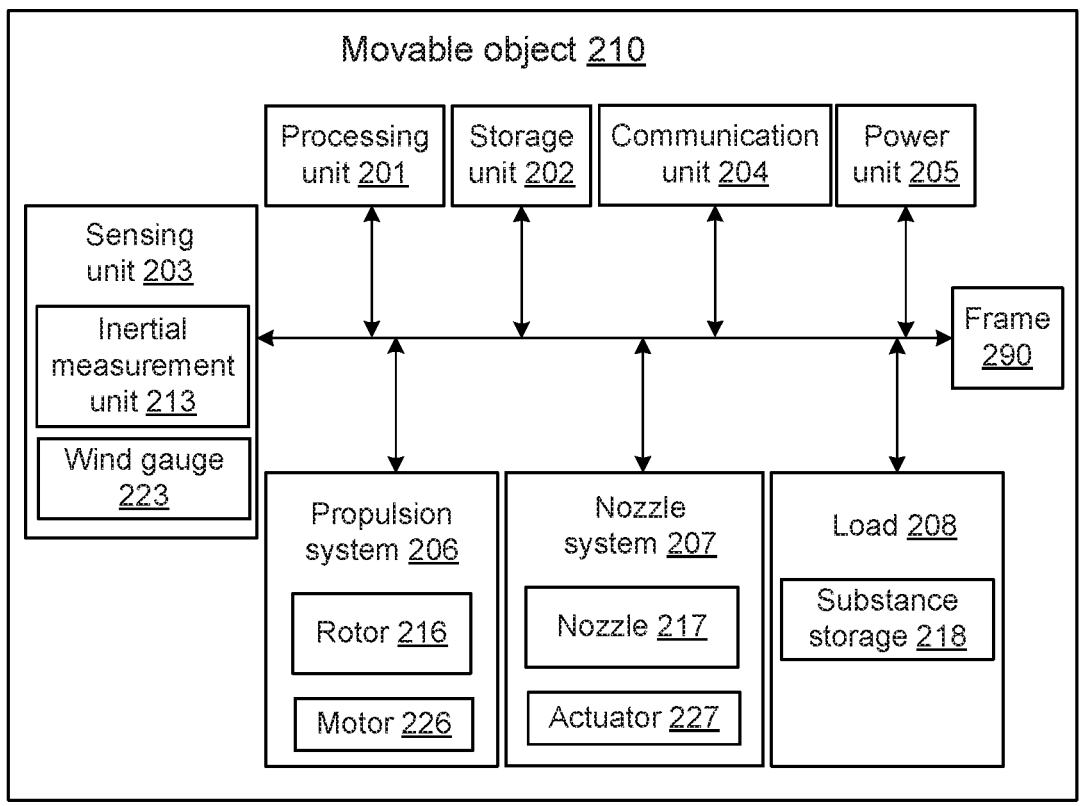
FIGS. 2B-2C are block diagrams illustrating devices for aerial dispensing, consistent with the exemplary embodiments of the present disclosure.

The movable object 210 is described generally here, and detailed descriptions of its components and functions are provided below with reference to FIG. 2B. The movable object may be configured to move within any suitable environment, such as in air (e.g., a fixed-wing aircraft, a rotary-wing aircraft, or an aircraft having neither fixed wings nor rotary wings).

The movable object may be capable of moving freely within the environment with respect to six degrees of freedom (e.g., three degrees of freedom in translation and three degrees of freedom in rotation). Alternatively, the movement of the movable object may be constrained with respect to one or more degrees of freedom, such as by a predetermined path, track, or orientation. The movement may be actuated by any suitable actuation mechanism, such as an engine or a motor. The actuation mechanism of the movable object may be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof.

In some instances, the movable object may be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons).

A vehicle may be self-propelled, such as self-propelled through the air, on or in water, in space, or on or under the ground. A self-propelled vehicle may utilize a propulsion system, such as a propulsion system including one or more engines, motors, wheels, axles, magnets, rotors, propellers, blades, nozzles, or any suitable combination thereof. In some instances, the propulsion system may be used to enable the movable object to take off from a surface, land on a surface, maintain its current position and/or orientation (e.g., hover), change orientation, and/or change position.

The movable object may be controlled remotely by a user. For example, the movable object may be controlled with the aid of a controlling terminal and/or monitoring terminal (e.g., the terminal device 220). The user may be remote from the movable object, or on or in the movable object while using the controlling terminal and/or monitoring terminal to control the movable object. The movable object may be a UAV. An unmanned movable object may not have an occupant onboard the movable object. The movable object may be controlled by a human or an autonomous control system (e.g., a computer control system), or any suitable combination thereof. The movable object may be an autonomous or semi-autonomous robot, such as a robot configured with artificial intelligence.

The movable object may have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human.

The terminal device 220 may be implemented as various devices (e.g., a computer, a smart phone, a tablet, a controller of the movable object 210, a virtual reality helmet, a simulator, a pair of smart glasses, a wearable device, etc.). Detailed descriptions of its components and functions are provided below with reference to FIG. 2C.

FIG. 2B is a block diagram illustrating a system, implemented as a movable object 210, for aerial dispensing, consistent with the exemplary embodiments of the present disclosure. The movable object 210 may include a processing unit 201, a storage unit 202, a sensing unit 203, a communication unit 204, a power unit 205, a propulsion system 206, a nozzle system 207, and a load 208, all of which may be mounted on or coupled to a frame 290 (e.g., an airframe of a UAV) and operatively coupled to one another through one or more channels. For example, the power unit 205 may couple to the propulsion system through a power channel, the load 208 may include a container configured to hold the dispensing substance, the container is coupled to the nozzle system 207 through a mechanical channel (e.g., a pump and tubing channel may carry the dispensing substance from the load to the nozzle), and the processing unit 201 may couple to the storage unit 202 through a communication bus. In some embodiments, the load 208 may include other payloads such as a camera. One or more of the components of the movable object 210 may be optional. The movable object 210 can comprise one or more similar components, such as one more propulsion systems 206, one or more nozzle systems 207, etc. In some embodiments, the movable object 210 may include many more components than those shown in FIG. 2B. However, it is not necessary that all of these components be shown in order to disclose an illustrative embodiment. For example, the processing unit 201, alone or in combination with another unit or device (e.g., the propulsion system 206), may implement the aerial dispensing method disclosed herein.

The processing unit 201 may have one or more processors, such as a programmable processor (e.g., a central processing unit (CPU), a field-programmable gate array (FPGA), an application specific integrated circuit (ASIC), etc.). The storage unit 202 may be a non-transitory computer readable medium storing logic, code, and/or instructions executable by the processing unit 201 for performing one or more methods disclosed herein. In various embodiments, the storage unit 202 may be based on semiconductor, magnetic, optical, or any suitable technologies. The storage unit 202 can include one or more memory units (e.g., random access memory (RAM), read-only memory (ROM), flash memory, USB drives, memory cards, solid-state drives (SSDs), hard disk drives (HDDs), floppy disks, optical disks, magnetic tapes, SD cards, etc.). In some embodiments, data from the sensing unit 203 can be directly conveyed to and stored within the memory units of the storage unit 202. The memory units of the storage unit 202 can store logic, code, and/or instructions executable by the processing unit 201 to perform any suitable embodiment of the methods described herein. For example, the processing unit 201 can be configured to execute instructions to perform the disclosed aerial dispensing method to at least mitigate the wind drift. The memory units can store data to be processed by the processing unit 201. In some embodiments, the memory units of the storage unit 202 can be used to store the processing results produced by the processing unit 201. In some embodiments, the processing unit 201 and/or the storage unit 202 may be implemented as one or more controllers configured to control one or more components of the movable object 210. For example, a UAV may comprise one or more controllers, propulsions systems and nozzle system coupled to one another, and may dispense a substance from air (e.g., through the one or more nozzle systems). The one or more controllers may be configured to control at least one of the propulsion systems or the nozzle systems based on a wind velocity, to cause at least mitigation to a drift of the substance from wind.

The sensing unit 203 may be configured to utilize different types of sensors that collect information relating to the aircrafts and the environment in different ways. Different types of sensors may sense different types of signals or signals from different sources. For example, the sensing unit 203 can include an inertial measurement unit (IMU) 213. The IMU 213 may be configured to detect a spatial disposition and/or a change in the spatial disposition of the movable object 210 (e.g., an x-y-z position, a pitch angle, a roll angle, an yaw angle, etc.) Alternatively, the sensing unit 203 may include one or more other sensors (e.g., a radar, lidar, ultrasound sensor, infrared sensor, etc.), a gyroscope, an accelerometer, a GPS (Global Positioning System) sensor, a magnetometer, and/or image sensors (e.g., a camera, etc.). For example, the sensing unit 203 may include a radar to keep track of the altitude of the movable object relative to the ground. For some implementation, the movable object may need to fly at a constant altitude to keep the dispensing width constant. For another example, the sensing unit 203 can include a wind gauge 223 (or alternatively known as an anemometer, an anemoscope, an air speedometer, etc.) configured to measure the wind velocity.

The communication unit 204 may be configured to transmit/receive data (e.g., sensing data, operating instructions, etc.) from/to a suitable external device or system (e.g., the terminal device 220, a display device, a remote controller, etc.). Any suitable means of communication can be used, such as wired communication or wireless communication. For example, the communication unit 204 can utilize one or more of local area networks (LAN), wide area networks (WAN), infrared, radio, Wi-Fi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication unit 204 can transmit and/or receive one or more of sensing data from the sensing unit 203, processing results produced by the processing unit 201, predetermined control data, user commands from a terminal or remote controller, and the like.

The communication unit 204 may include connectors for wired communications, wireless transmitters and receivers, and/or wireless transceivers for wireless communications. The communications may comprise control signals and/or data. The connectors, transmitters/receivers, or transceivers may be configured for two-way communication between the movable object 210 and various devices. For example, The connectors, transmitters/receivers, or transceivers may send and receive operating signals and/or data to and from the movable object 210 or another device.

The power unit 205 may be configured to supply power to one or more components of the movable object 210 for supporting various operations. The power unit 205 may include regular batteries (e.g., lithium-ion batteries), wirelessly chargeable batteries, and solar panel powered batteries (e.g., batteries attached to light-weight solar panels disposed on the movable object).

The propulsion system 206 may be configured to control one or more components of movable object 210 to effectuate a change in the spatial disposition of the movable object 210. For example, the propulsion system 206 may include rotors 216 and motor 226 configured to drive the movable object in any direction in the air. The propulsion system 206 can be configured to adjust the spatial disposition (e.g., pitch angle, roll angle, yaw angle, etc.), velocity, and/or acceleration of the movable object with respect to six degrees of freedom. One or more parameters of the rotors 216 such as the direction and speed of rotation may be actuated by the propulsion mechanisms to effectuate the spatial disposition change. Alternatively or in combination, the propulsion system 206 can control the spatial disposition of a carrier or payload of the movable object 210. In some embodiments, if the movable object include a substance-dispensing nozzle and the nozzle is stationary relative to the movable object, the spatial change of the movable object can effectively translate to a spatial change of the nozzle relative to the 3D space.

An exemplary movable object 210 is a UAV. The UAV may include a propulsion system having one or more rotors. Any number of rotors may be provided (e.g., one, two, three, four, five, six, seven, eight, or more). The rotors, rotor assemblies, or other propulsion systems of the unmanned aerial vehicle may enable the unmanned aerial vehicle to hover/maintain position, change orientation, and/or change location. The distance between shafts of opposite rotors may be any suitable length. Any description herein of a UAV may apply to a movable object, such as a movable object of a different type, and vice versa.

The nozzle system 207 may include one or more actuators 227 configured to effectuate the spatial disposition change of the one or more nozzles 217. For example, the actuator 227 may extend or retract a nozzle 217 (e.g., by actuating expansion joints of a tube). For another example, the actuator 227 can be configured to control the nozzle 217 to adjust the spatial disposition (e.g., x-y-z position, pitch angle, roll angle, yaw angle, etc.) with respect to six degrees of freedom (e.g., by actuating a telescopic or otherwise extendable rod attached to the nozzle, and/or actuating a rotator valve or otherwise rotatable mechanism attached to the nozzle). For yet another example, the actuator 227 may include a pump and associated tubes and air cylinders to carry the dispensing substance from the load to the nozzle.

In some embodiments, the movable object may be configured to carry a load 208. The load may include one or more of passengers, cargo, equipment, instruments, and the like. The load may be provided within a housing. The housing may be separate from a housing of the movable object, or be part of a housing for a movable object. Alternatively, the load may be provided with a housing while the movable object does not have a housing. Alternatively, portions of the load or the entire load may be provided without a housing. The load may be rigidly fixed relative to the movable object. Optionally, the load may be movable relative to the movable object (e.g., translatable or rotatable relative to the movable object).

In some embodiments, the load may include a payload. The payload may be configured not to perform any operation or function. Alternatively, the payload may be a payload configured to perform an operation or function, also known as a functional payload. For example, the payload may be an image capturing device. Any suitable sensor may be incorporated into the payload, such as an image capture device (e.g., a camera), an audio capture device (e.g., a parabolic microphone), an infrared imaging device, or an ultraviolet imaging device. The sensor may provide static sensing data (e.g., a photograph) or dynamic sensing data (e.g., a video). In some embodiments, the sensor provides sensing data for the target of the payload. In some embodiments, the payload may include a substance storage 218. The substance storage 218 may be configured to store the substance for dispense (e.g., a nutrient, a seed, a pesticide, a herbicide, or a chemical fire extinguisher). The substance storage 218 may be made of any suitable material (e.g., plastic, carbon fiber, etc.). The substance storage 218 may be coupled to the nozzle system 207 through various channels (e.g., plastic tubes and a pump), so that the substance can be transported to the nozzle(s) for dispense.

Alternatively or in combination, the payload may include one or more emitters for providing signals to one or more targets. Any suitable emitter may be used, such as an illumination source or a sound source. In some embodiments, the payload includes one or more transceivers, such as for communication with a module remote from the movable object. For example, the communication may be with a terminal device described herein. Optionally, the payload may be configured to interact with the environment or a target. For example, the payload may include a tool, instrument, or mechanism capable of manipulating objects, such as a robotic arm.

Optionally, the load may include a carrier. The carrier may be provided for the payload and the payload may be coupled to the movable object via the carrier, either directly (e.g., directly contacting the movable object) or indirectly (e.g., not contacting the movable object). Conversely, the payload may be mounted on the movable object without requiring a carrier. The payload may be integrally formed with the carrier. Alternatively, the payload may be releasably coupled to the carrier. In some embodiments, the payload may include one or more payload elements, and one or more of the payload elements may be movable relative to the movable object and/or the carrier, as described above.

The carrier may be integrally formed with the movable object. Alternatively, the carrier may be releasably coupled to the movable object. The carrier may be coupled to the movable object directly or indirectly. The carrier may provide support to the payload (e.g., carry at least part of the weight of the payload). The carrier may include a suitable mounting structure (e.g., a gimbal platform or a gimbal stabilizer) capable of stabilizing and/or directing the movement of the payload. In some embodiments, the carrier may be adapted to control the status of the payload (e.g., position and/or orientation) relative to the movable object. For example, the carrier may be configured to move relative to the movable object (e.g., with respect to one, two, or three degrees of translation and/or one, two, or three degrees of rotation) such that the payload maintains its position and/or orientation relative to a suitable reference frame regardless of the movement of the movable object. The reference frame may be a fixed reference frame (e.g., the surrounding environment). Alternatively, the reference frame may be a moving reference frame (e.g., the movable object, a payload target).

In some embodiments, the carrier may be configured to permit movement of the payload relative to the carrier and/or movable object. The movement may be a translation with respect to up to three degrees of freedom (e.g., along one, two, or three axes) or a rotation with respect to up to three degrees of freedom (e.g., about one, two, or three axes), or any suitable combination thereof.

In some instances, the carrier may include a carrier frame assembly and a carrier actuation assembly. The carrier frame assembly may provide structural support to the payload. The carrier frame assembly may include individual carrier frame components, some of which may be movable relative to one another. The carrier actuation assembly may include one or more actuators (e.g., motors, air cylinders) that actuate movement of the individual carrier frame components. The actuators may permit the movement of multiple carrier frame components simultaneously, or may be configured to permit the movement of a single carrier frame component at a time. The movement of the carrier frame components may produce a corresponding movement of the payload. For example, the carrier actuation assembly may actuate a rotation of one or more carrier frame components about one or more axes of rotation (e.g., roll axis, pitch axis, or yaw axis). In some cases where the UAV has an even number of rotors disposed symmetrically about a centered vertical axis, the roll axis/angle and the pitch axis/angle may be used interchangeably. The rotation of the one or more carrier frame components may cause a payload to rotate about one or more axes of rotation relative to the movable object. Alternatively or in combination, the carrier actuation assembly may actuate a translation of one or more carrier frame components along one or more axes of translation, and thereby produce a translation of the payload along one or more corresponding axes relative to the movable object.

The components of the system 200 can be arranged in any suitable configuration. For example, one or more of the components of the movable object 210 can be located on an aircraft, a carrier, a payload, a terminal, a sensing system, or an additional external device (e.g., the terminal device 220) in communication with one or more of the above. Additionally, although FIG. 2B depicts a single processing unit 201 and a single storage unit 202, one of skill in the art would appreciate that this is not intended to be limiting, and that the system 200 can include a plurality of processing units and/or non-transitory computer readable media. In some embodiments, one or more of the plurality of processing units and/or non-transitory computer readable media can be situated at different locations, such as on the aircraft, carrier, payload, terminal, additional external device in communication with one or more of the above, or suitable combinations thereof, such that any suitable aspect of the processing and/or memory functions performed by the system can occur at one or more of the aforementioned locations.

Figure 2C:
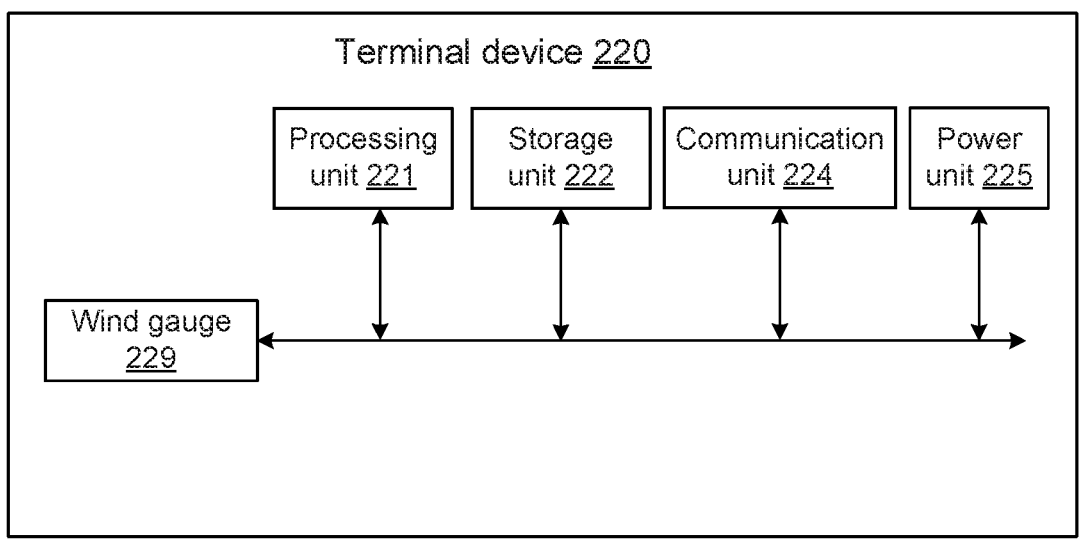

FIG. 2C is a block diagram illustrating a system, implemented as a terminal device 220, for aerial dispensing, consistent with the exemplary embodiments of the present disclosure. The terminal device 220 may include a processing unit 221, a storage unit 222, a wind gauge 229 (or alternatively known as an anemometer, an anemoscope, an air speedometer, etc.), a communication unit 224, and a power unit 225, operatively coupled to one another through one or more channels. For example, the power unit 225 may couple to the processing unit 221 through a power channel, and the processing unit 221 may couple to the storage unit 222 through a communication bus. One or more of the components of the terminal device 220 (e.g., the wind gauge 229) may be optional. In some embodiments, the terminal device 220 may include many more components than those shown in FIG. 2C. However, it is not necessary that all of these components be shown in order to disclose an illustrative embodiment. For example, the processing unit 221, alone or in combination with another system or device (e.g., the movable object 210), may implement the aerial dispensing method disclosed herein.

The processing unit 221 may have one or more processors, such as a programmable processor (e.g., a central processing unit (CPU), a field-programmable gate array (FPGA), an application specific integrated circuit (ASIC), etc.). The storage unit 222 may be a non-transitory computer readable medium storing logic, code, and/or instructions executable by the processing unit 221 for performing one or more methods disclosed herein. In various embodiments, the storage unit 222 may be based on semiconductor, magnetic, optical, or any suitable technologies. The storage unit 222 can include one or more memory units (e.g., random access memory (RAM), read-only memory (ROM), flash memory, USB drives, memory cards, solid-state drives (SSDs), hard disk drives (HDDs), floppy disks, optical disks, magnetic tapes, SD cards, etc.). In some embodiments, data from wind gauge 229 can be directly conveyed to and stored within the memory units of the storage unit 222. The wind gauge 229 may be configured to measure the wind velocity. The memory units of the storage unit 222 can store logic, code, and/or instructions executable by the processing unit 221 to perform any suitable embodiment of the methods described herein. For example, the processing unit 221 can be configured to execute instructions to instruct the processing unit 201 described above to perform method 500 described below with reference to FIG. 5. For another example, the processing unit 221 and the processing unit 201 described above may be configured to perform method 500 described below (e.g., the processing unit 221 performs step 501 of the method 500, and the processing unit 201 performs step 502 of the method 500). The memory units can store data to be processed by the processing unit 221. In some embodiments, the memory units of the storage unit 222 can be used to store the processing results produced by the processing unit 221.

The communication unit 224 may be configured to transmit/receive data (e.g., wind gauge data, operating instructions, etc.) from/to a suitable external device or system (e.g., the movable object 210, a display device, etc.). Any suitable means of communication can be used, such as wired communication or wireless communication. For example, the communication unit 224 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication unit 224 can transmit and/or receive one or more of sensing data from the wind gauge 229, processing results produced by the processing unit 221, predetermined control data, user commands from a terminal or remote controller, and the like.

The communication unit 224 may include connectors for wired communications, wireless transmitters and receivers, and/or wireless transceivers for wireless communications. The communications may comprise control signals and/or data. The connectors, transmitters/receivers, or transceivers may be configured for two-way communication between the terminal device 220 and various devices. For example, The connectors, transmitters/receivers, or transceivers may send and receive operating signals and/or data to and from the movable object 210 or another device.

The power unit 225 may be configured to supply power to one or more components of the terminal device 220 for supporting various operations. The power unit 225 may include regular batteries (e.g., lithium-ion batteries), wirelessly chargeable batteries, and solar panel powered batteries (e.g., batteries attached to light-weight solar panels).

An exemplary terminal device 220 is a controller. The controller may be configured to control a UAV (a movable object 210) to perform the disclosed aerial dispensing methods. For example, the controller may change a flight path of the UAV, such that the landing position of the dispensed substance is unaffected by the wind. Although FIG. 2C depicts a single processing unit 221 and a single storage unit 222, one of skill in the art would appreciate that this is not intended to be limiting, and that the terminal device 220 can include a plurality of processing units and/or non-transitory computer readable media. In some embodiments, one or more of the plurality of processing units and/or non-transitory computer readable media can be situated at different locations, such as on the aircraft, carrier, payload, terminal, additional external device in communication with one or more of the above, or suitable combinations thereof, such that any suitable aspect of the processing and/or memory functions performed by the system can occur at one or more of the aforementioned locations.

FIGS. 3A-3B are graphical representations illustrating comparing a first spatial disposition (FIG. 3A, in a no wind condition) with a second spatial disposition (FIG. 3B, in a wind condition) of the UAV for aerial dispensing, consistent with the exemplary embodiments of the present disclosure. In some embodiments, the first spatial disposition, obtained in a no-wind condition, may be referred to as a default spatial disposition, and the second spatial disposition, obtained under a wind influence, may be referred to as a current spatial disposition. To obtain the wind velocity, one or more parameters may be monitored and compared, such as a UAV status (e.g., the six degree of freedom UAV spatial disposition measured by an inertial measurement unit on the UAV), a UAV propulsion system status (e.g., the power of a motor powering the UAV rotors and the rotation speeds of the UAV rotors), a user entered parameter (e.g., user-defined parameters directly or indirectly input to the UAV), a wind gauge measurement (e.g., a device carried on the UAV or outside the UAV to measure the wind velocity), etc. For example, the UAV statuses described in FIGS. 3A and 3B may be compared, and a corresponding wind velocity may be obtained as described below with reference to FIG. 3C. For another example, the propulsion system statuses of the UAV in FIGS. 3A and 3B may be compared to obtain a corresponding wind velocity. For yet another example, a user may input the first spatial disposition and/or the second spatial disposition with respectively associated parameters to obtain the wind velocity. For yet another example, a user may input a current and/or a default wind condition (e.g., wind speed and direction) to obtain the wind velocity. For yet another example, the wind velocity may be measured by a wind gauge. The wind gauge may be disposed on the UAV, or outside the UAV (e.g., on the ground, on another device, etc.).

Figure 3A:
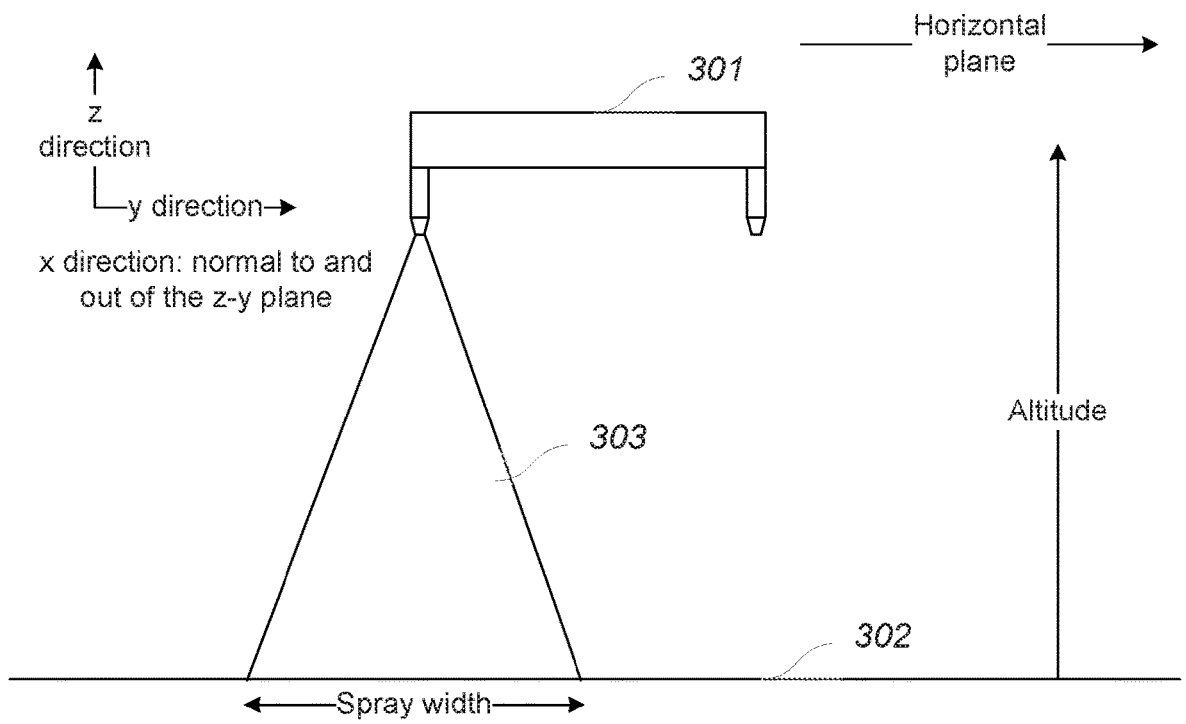
FIG. 3A is a graphical representation illustrating a first spatial disposition of a UAV for aerial dispensing, consistent with the exemplary embodiments of the present disclosure.

FIG. 3A illustrates an exemplary status of the UAV 301 in a no-wind condition. For example, the UAV 301 may hover at a certain altitude, while dispensing the substance from one or more nozzles of the UAV 301 towards the ground surface 302. The substance may exit the nozzle in a diverging angle, and spread towards a planned dispensing area. In the air, the dispensed substance may appear as dropping through a cone volume 303. Since no wind is present and assuming the nozzle is not biased in any direction (e.g., nozzle spraying towards the ground in all horizontal directions evenly), the dispensed substance may appear even in all directions in the horizontal plane with respect to the UAV. Further, the UAV 301 may appear substantially parallel to the horizontal plane (e.g., zero pitch and roll angles). This spatial disposition (e.g., the pitch, roll, and yaw angles, the altitude of the UAV, etc.) and associated parameters (e.g., the accelerations of the UAV in x, y, and z directions, the rotor speed and directions, the unit mass of the dispensed substance, the spreading angle of the dispensed substance, the spray width on the ground surface, etc.) may be included in the first spatial disposition of the UAV in a no-wind condition and stored. For another example, the UAV may fly in the x-direction (e.g., out of the plane of the paper) at a certain altitude, while dispensing the substance from one or more nozzles of the UAV 301 towards the ground surface 302. In this flight pattern, the UAV is still stationary in the y-direction (e.g., within the horizontal plane and perpendicular to the motion of the UAV 301), with the dispensing angle and landing position shown in FIG. 3A. Although the examples provided here are mainly based on a constant flying altitude, the altitude can be adjusted in real-time depending on the application.

Figure 3B:
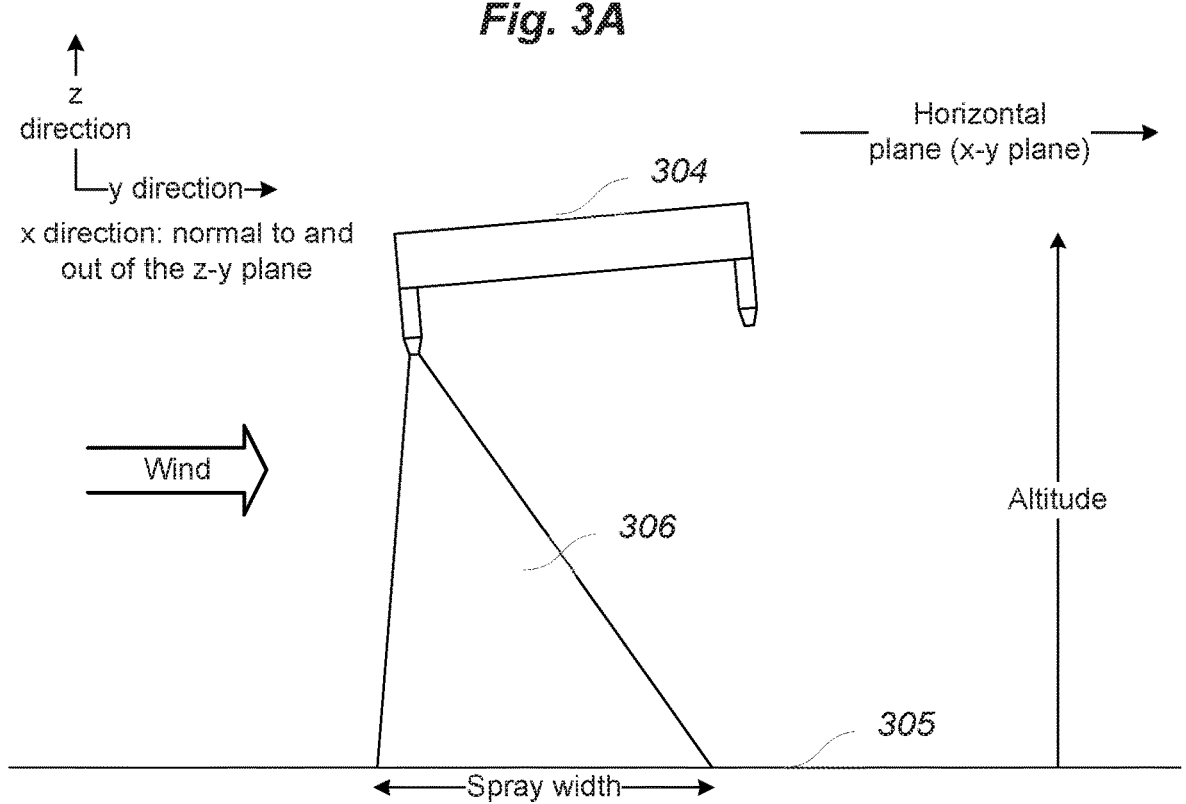
FIG. 3B is a graphical representation illustrating a second spatial disposition of a UAV for aerial dispensing, consistent with the exemplary embodiments of the present disclosure.

FIG. 3B illustrates an exemplary status of the UAV 304 under wind influence. For example, the UAV 304 may hover at a certain altitude, while dispensing the substance from one or more nozzles of the UAV 304 towards the ground surface 305. Both the UAV 304 and the dispensed substance 306 may be affected by the wind. To counter the wind effect (e.g., to remain in the same hovering position in the 3D space), the UAV 304 may adjust a spatial disposition (e.g., a pitch angle, a roll angle, a yaw angle, etc.) as shown in this figure. For example, the rotors at the right side of the UAV 304 may rotate faster than those on the left side, such that the right side of the UAV 304 lifts higher than the left side. As a result of the tilt of the rotors, a leftward driving force counters the wind and balances the UAV 304 in the same position horizontally. Accordingly, a second spatial disposition of the UAV in a windy condition including associated parameters may be captured and stored.

By comparing the first spatial disposition (e.g., in the no-wind condition) with the second spatial disposition discussed above (e.g., under the wind influence), the wind velocity can be derived or otherwise obtained. For example, relationship between the spatial disposition and the acceleration of the UAV can be mapped, such that each spatial disposition or spatial disposition change may be associated with a wind velocity and/or with a propulsion system status.

The obtained wind velocity may comprise a magnitude and a direction of the wind. In some embodiments, the obtained wind velocity may include only magnitude or only direction information. The direction may include, for example, a direction in the horizontal plane and perpendicular to the movement of the UAV. Therefore, the obtained wind velocity may be divided into components in multiple direction perpendicular to each other, and the wind velocity in the y-direction (that is, the direction in the horizontal direction and perpendicular to the line of motion of the UAV) may be relevant to the drift. Since the dispensed substance is blown downwind while dropping towards the ground 305, the cone volume 303 of the dispensed substance described above may become distorted into a volume 306 leaning towards the downwind direction. As a result, the landing position of the dispensed substance will shift downwind compared to that in FIG. 3A. The drift is related to the wind velocity (that is, the wind speed and direction) and to the drop time of the dispensed substance from the nozzle to the ground, and the drop time is related to the UAV altitude relative to the ground and the average drop speed of the dispense substance, as expressed in the following formula. The drift distance may scale linearly with the wind speed.

Drift distance =

$$\text{Wind velocity} \times \text{Drop Time} = \text{Wind velocity} \times \frac{\text{Relative UAV Altitude}}{\text{Average Drop Speed}}$$

In some embodiments, the UAV 304 may fly in a certain direction (e.g., in the x-direction) at a certain altitude under wind influence, while dispensing the substance from one or more nozzles of the UAV 304 towards the ground surface 305. In a 3D space, the force exerted by the wind to the UAV 304 may be resolved into three forces in the x, y, and z directions. In the vertical direction (the z direction), the z-direction wind force may be countered by a change in rotor speed(s). In the horizontal plane (the x-y plane), the wind drift to substance in the x-direction may not matter since the flight path may be mostly a straight path and the planned area would still be covered in the x-direction even with the drift. The y-direction wind force may be the main cause for the drift and the detrimental consequences discussed above. Therefore, obtaining the wind velocity may comprise obtaining the wind speed in the y-direction.

There may be many other alternative baseline embodiments other than that discussed in FIG. 3A to be compared with FIG. 3B. That is, the second spatial disposition and associated parameters can be compared with any predetermined baseline spatial disposition and associated parameters to obtain the wind velocity, determine the drift, etc. The predetermined baseline embodiment may include an embodiment in a no-wind condition such as that in FIG. 3A or an embodiment with a predetermined condition. The predetermined condition may include a predetermined wind velocity, a predetermined spatial disposition, etc. A comparison between the embodiment of FIG. 3B and the predetermined embodiment may be performed similarly to that between the embodiment of FIG. 3A and the embodiment of FIG. 3B. The predetermined embodiment may include a predetermined spatial disposition associated with a predetermined wind condition. For example, when the baseline embodiment is in a wind condition, the baseline may include a predetermined spatial disposition of a UAV with an associated wind velocity (e.g., a mild wind in a predetermined direction) and an associated drift distance. The baseline may also include an associated drift distance, based on which the original landing position in no-wind condition can be calculated. A current spatial disposition of the UAV may be compared with the baseline to determine a difference in the spatial disposition. Based on the determined difference in spatial disposition, a change (e.g., an increase, a decrease, or a zero change) in wind velocity may be determined. Accordingly, one or more components of the UAV may be adjusted to at least partially counter the change in the wind velocity.

Figure 3C:
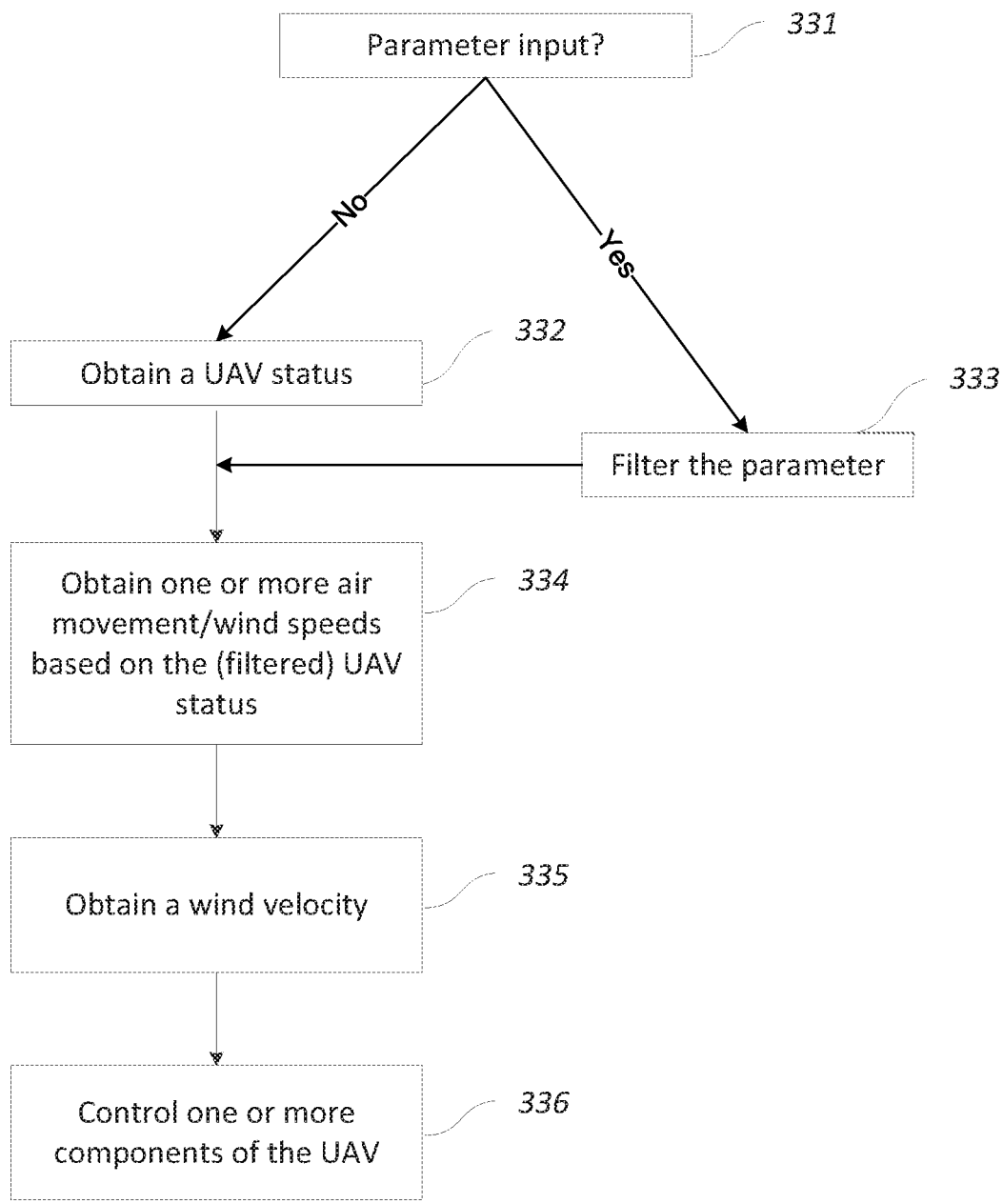
FIG. 3C is a flow chart illustrating a method for aerial dispensing, consistent with the exemplary embodiments of the present disclosure.

FIG. 3C is a flow chart illustrating a method 300 for aerial dispensing, consistent with the exemplary embodiments of the present disclosure. The method 300 may comprise a number of steps, some of which may be optional or may be rearranged in another order. One or more steps of the method 300 may be implemented by one or more components of the system 200 (e.g., the movable object 210).

At step 331, it may be determined if any UAV parameter has been input. The parameter input may include, for example, a user input for controlling one or more status of the UAV (e.g., its spatial disposition). For example, a user may have set the UAV to fly from position A to position B at altitude h and a roll angle of 10 degrees. The user input may be directly entered to the movable object 210, transmitted via the terminal device 220, etc. If the determination of the step 331 is no, the method 300 proceeds to step 332. If the determination to the step is yes, the method 300 proceeds to step 333.

At step 332, a status of the UAV (e.g., a current status) is obtained as described above with reference to FIG. 3B.

At step 333, the input parameter may be filtered. The input parameter(s) may be filtered out from the status obtained in the step 332. For example, if an obtained roll angle is 30 degrees and the input roll angle is 10 degrees, the filtered status of the roll angle should be 20 degrees.

At step 334, one or more air movement/wind speeds may be obtained based on the (filtered) UAV status. The UAV status may include the 3D position, the pose angle, the propulsion system status (e.g., the rotor speed, the motor power), etc. The one or more air movement speeds may include a speed along the flight path, a speed in the horizontal plane and perpendicular to the flight path, a speed in the vertical plane and perpendicular to the flight path, etc. For example, the wind speed in the y-direction may be obtained as described above with reference to FIG. 3B.

At step 335, the wind velocity (e.g., the current wind velocity including the magnitude and direction) may be obtained based on (e.g., vectorially summed over) the air movement speeds obtained from the step 334.

At step 336, one or more components of the UAV may be controlled to mitigate the wind effect. Details are described below with reference to FIGS. 4A-4G.

FIGS. 4A-4G are graphical representations illustrating controlling one or more components of the UAV to cause a movement relative to a 3D space of at least one nozzle that dispenses the substance, consistent with the exemplary embodiments of the present disclosure. In these figures, solid-line representations may indicate a status or spatial disposition of the UAV under wind influence without implementing the disclosed wind-countering methods, and dash-line representations may indicate a status or spatial disposition of the UAV under wind influence while implementing various wind-countering methods. In these implementations, one or more components of the UAV may be actuated to cause a movement of at least one nozzle relative to the 3D space coordinates (e.g., by controlling the UAV, by controlling the nozzle, by actuating rotors, motors, or other relevant mechanical components thereof, etc.) to mitigate the drift caused by the wind. The movement may at least partially counter the obtained wind velocity. The movement may include a linear movement (e.g., motion along a straight line, from one 3D position to another 3D position) and/or an angular movement (e.g., motion about a fixed point, from one pitch/roll/yaw angle to another pitch/roll/yaw angle). The paths taken for the linear/angular movement may be modified/combined and are not necessarily absolute. For example, the UAV may change its flight path upwind or the nozzle may move upwind, such that the substance is dispensed upwind and lands at the planned location. The examples are not an exhaustive list of implementation modes. Any of the exemplary implementations may be modified and/or combined to mitigate the drift.

Figure 4A:
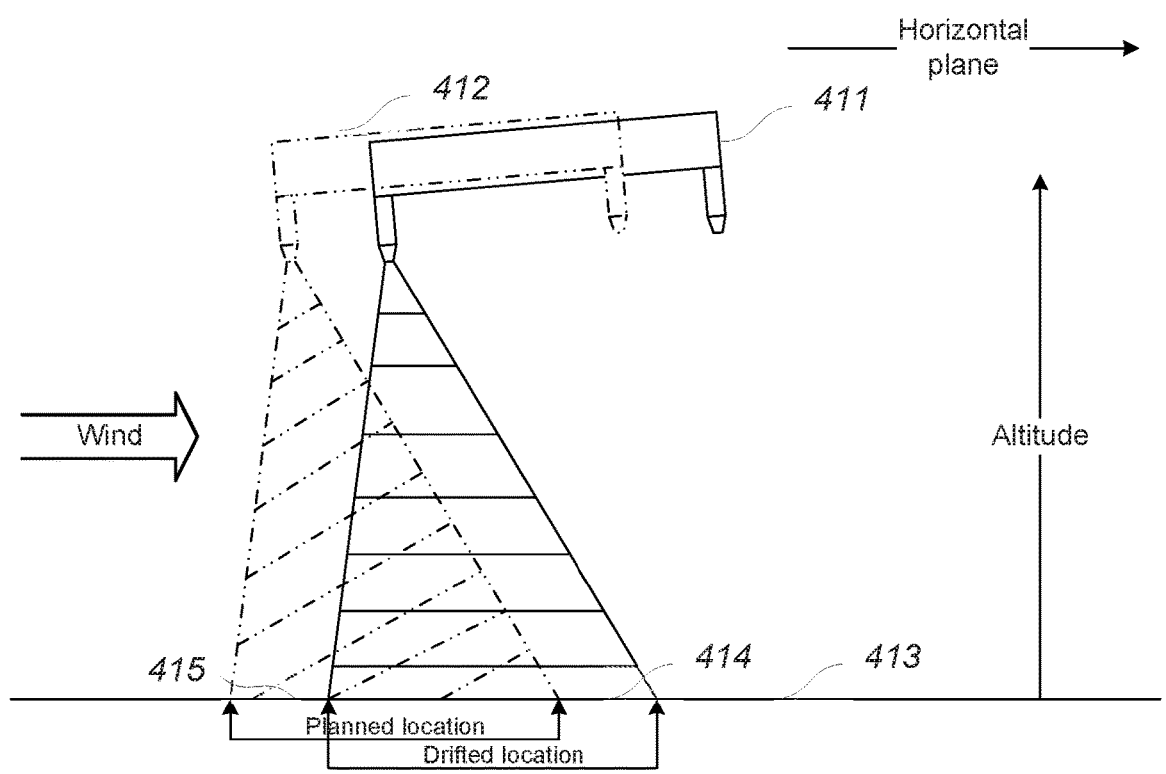
FIGS. 4A-4G are graphical representations illustrating controlling one or more components of the UAV to cause a movement of at least one nozzle that dispenses the substance relative to a 3D space, consistent with the exemplary embodiments of the present disclosure.

Referring to FIG. 4A, the UAV may actuate one or more components (e.g., the propulsion system, etc.) to cause a linear movement of the UAV in the horizontal plane of the 3D space, thus mitigating to the drift caused by the wind. In some embodiments, the UAV 411 may be hovering or flying at an altitude while dispensing the substance toward the ground 413, and the spray width may move from the planned location 415 to the drifted location 414 under the wind influence. Thus, flying the UAV upwind from the current position of the UAV 411 to position 412 may cause the spray area to move back to the planned location 415. Flying the UAV upwind may comprise flying the UAV against the wind force discussed above. The rotor and/or motor of the propulsion system may be actuated to effectuate the movement of the UAV. For example, for a two by two axially symmetric rotor configuration, any two rotors can be regarded as one side, and the other two as another side. Increasing the rotation of two rotors at the one side can cause the UAV tilt towards the other side, thus causing a horizontal force moving the UAV towards the other side. A personal of ordinary skill in the art would appreciate the application of other viable mechanisms to achieve similar results. In FIG. 4A, the drifted spray width and the planned spray width may be substantially similar in length.

Figure 4B:
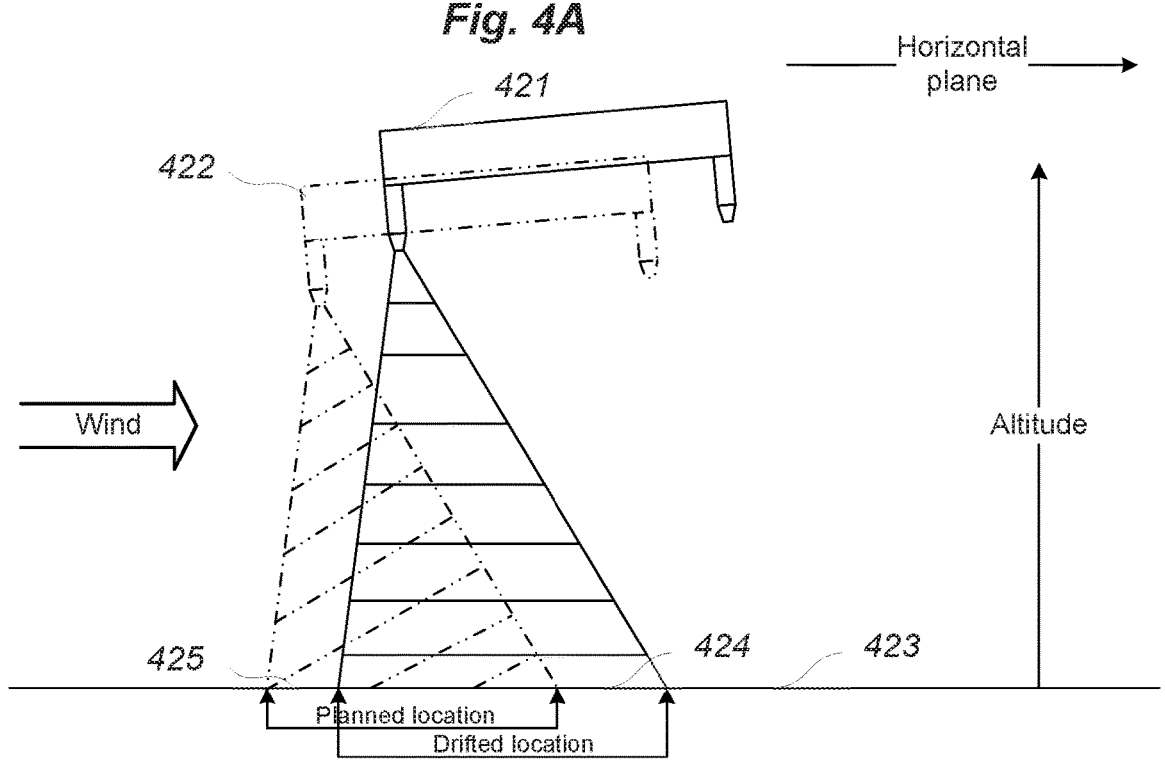

Referring to FIG. 4B, the UAV may actuate one or more components (e.g., the propulsion system, etc.) to cause a linear movement of the UAV in the horizontal plane and in the vertical direction of the 3D space, thus mitigating to the drift caused by the wind. In some embodiments, the UAV 421 may be hovering or flying at an altitude while dispensing the substance toward the ground 423, and the spray area may move from the planned location 425 to the drifted location 424 under the wind influence. Thus, flying the UAV upwind from the current position of the UAV 421 to position 422 may cause the spray area to move back to the planned location 425. Flying the UAV upwind may comprise flying the UAV against the wind force in the y-direction discussed above and changing the altitude of the UAV. The rotor and/or motor of the propulsion system may be actuated to effectuate the movement of the UAV. For example, for a two by two rotor configuration, in addition to moving in a horizontal plane, decreasing (or increasing) the rotation speeds of the motor and/or the rotor may cause the UAV to descend (or elevate). A personal of ordinary skill in the art would appreciate the application of other viable mechanisms to achieve similar results. In FIG. 4B, the drifted spray width and the planned spray width may be different in length. Thus, in addition to shifting the spray back to the planned location, controlling the UAV altitude may be implemented to control the spray width. For example, elevating the UAV may increase the spray width, while descending the UAV may decrease the spray width.

Figure 4C:
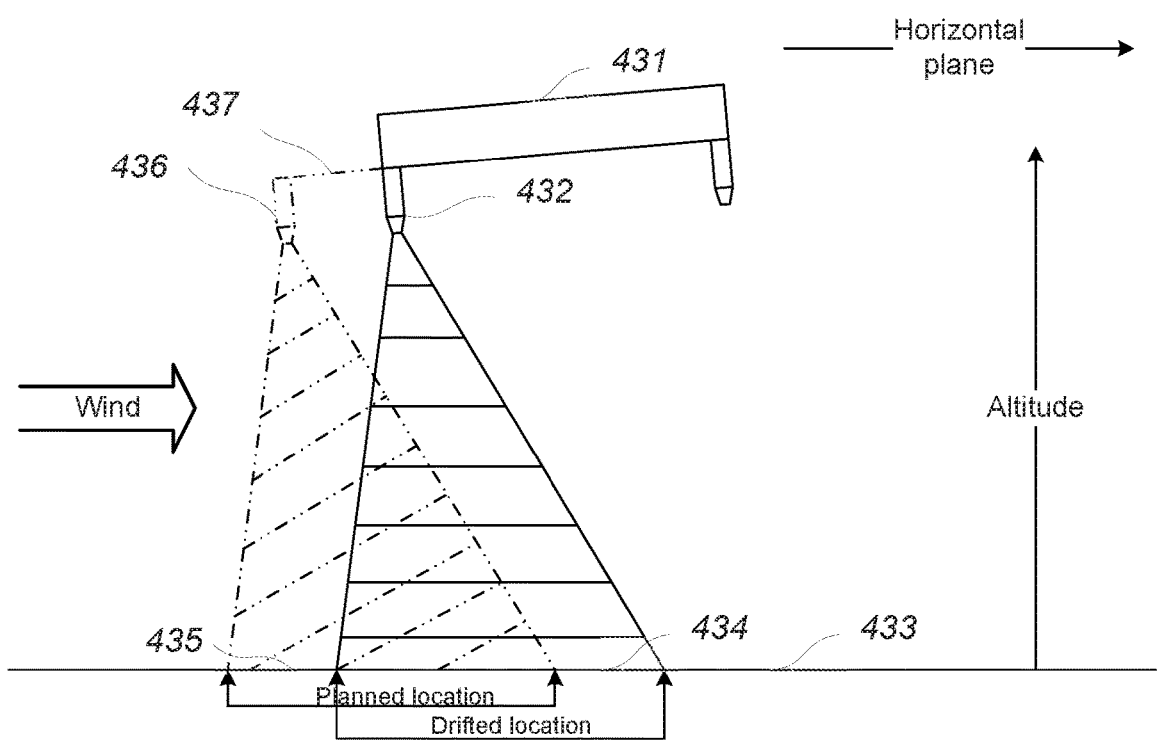

Referring to FIG. 4C, the UAV may actuate one or more components (e.g., the nozzle system, etc.) to cause a linear movement of at least one nozzle relative to the UAV, thus mitigating to the drift caused by the wind. In some embodiments, the UAV 431 may be hovering or flying at an altitude while dispensing the substance from a nozzle 432 toward the ground 433, and the spray width may move from the planned location 435 to the drifted location 434 under the wind influence. Thus, controlling the nozzle to move from the current position of the nozzle 432 to position 436 may cause the spray area to move back to the planned location 425. Controlling the nozzle may comprise moving the nozzle in the horizontal plane relative to the UAV. The actuator 227 discussed above may be actuated to effectuate the movement of the nozzle. For example, a motor may couple to one end of a telescopic rod 437, and the nozzle may couple to the other end. The motor may actuate the rod to extend or retract with respect to the UAV, such that the nozzle may be moved linearly with respect to the UAV. A personal of ordinary skill in the art would appreciate the application of other viable mechanisms to achieve similar results. In FIG. 4C, the drifted spray width and the planned spray width may be substantially similar in length. In this example, the UAV may not move in the y-direction, since the movement of the nozzle alone may bring the spray area back to the planned location.

Figure 4D:
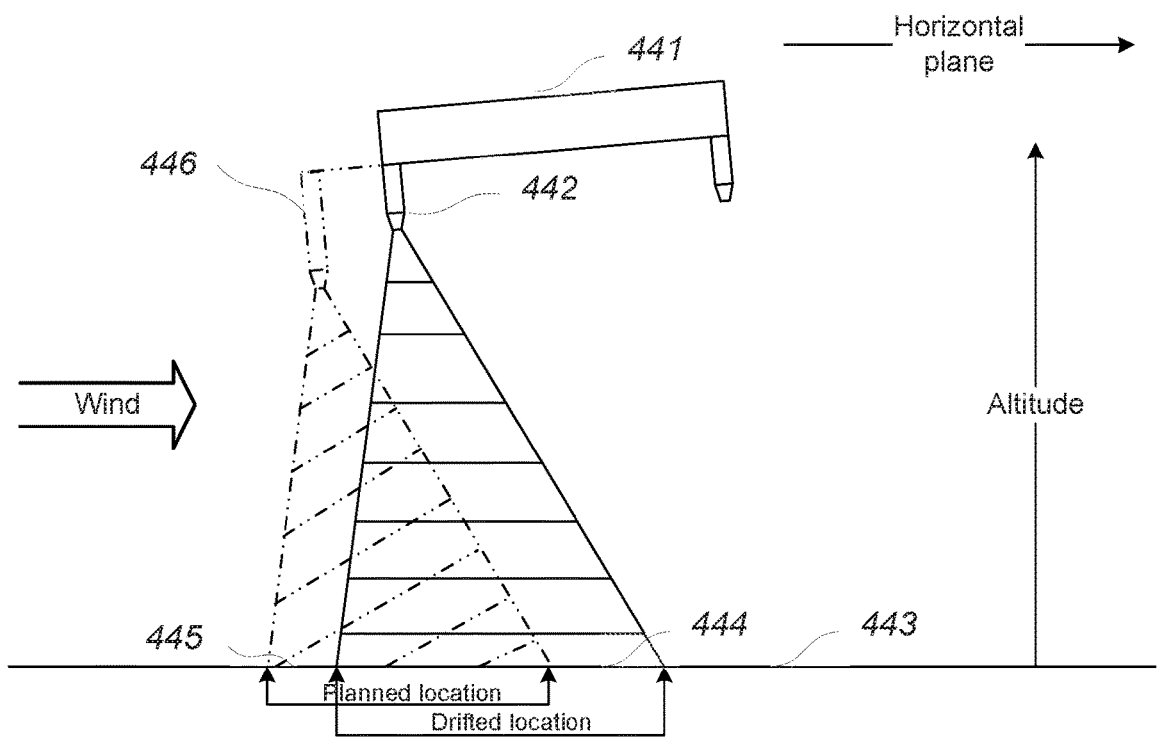

Referring to FIG. 4D, the UAV may actuate one or more components (e.g., the nozzle system, etc.) to cause a linear movement of at least one nozzle relative to the UAV, thus mitigating to the drift caused by the wind. In some embodiments, the UAV 441 may be hovering or flying at an altitude while dispensing the substance from a nozzle 442 toward the ground 443, and the spray area may move from the planned location 445 to the drifted location 444 under the wind influence. Thus, controlling the nozzle from the current position of the nozzle 442 to position 446 may cause the spray area to move back to the planned location 445. Controlling the nozzle may comprise moving the nozzle in the horizontal plane and in the vertical direction relative to the UAV. Moving the nozzle in the horizontal plane is similar to the discussion above with reference to FIG. 4C. Moving the nozzle in the vertical direction may be implemented by extending or retracting the nozzle via the actuator 227. For example, in addition to extending/retract the nozzle described above, the nozzle itself can extend/retract to effectuate a change of the origin of the dispense. A motor may couple to the nozzle, and the nozzle may be, for example, a telescopic tube or a tube with expansion joints, such that the motor can extend or retract the dispensing opening of the nozzle with respect to the UAV. A personal of ordinary skill in the art would appreciate the application of other viable mechanisms to achieve similar results. In FIG. 4D, the drifted spray width and the planned spray width may be different in length. Thus, in additional to shifting the spray back to the planned location, controlling the nozzle altitude may be implemented to effectuate the spray width. For example, elevating the nozzle may increase the spray width, while descending the nozzle may decrease the spray width.

Figure 4E:
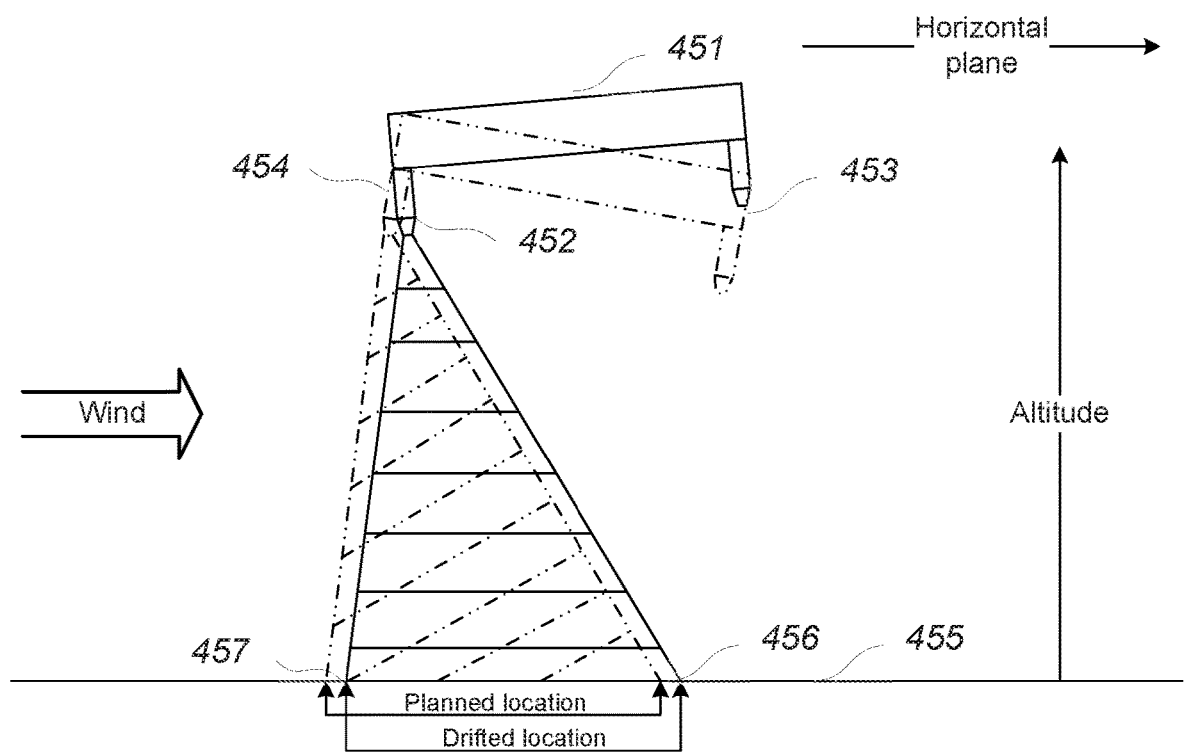

Referring to FIG. 4E, the UAV may actuate one or more components (e.g., the propulsion system, etc.) to cause an angular movement of the UAV relative to the 3D space, thus mitigating to the drift caused by the wind. In some embodiments, the UAV 451 may be hovering or flying at an altitude while dispensing the substance from the nozzle 452 toward the ground 455, and the spray width may move from the planned location 457 to the drifted location 456 under the wind influence. Thus, controlling the UAV to change from a the current pose of the UAV 451 to a pose 453 may cause the nozzle to change from pose 452 to pose 454, and accordingly, cause the spray area to move back to the planned location 457. Here, the pose change may refer to UAV's pitch, roll, and/or yaw angle change relative to the 3D space. For example, in this figure, assuming the UAV is flying out of the plane of the paper, the change from the pose 451 to the pose 453 represents a change in the roll angle of the UAV. The rotor and/or motor of the propulsion system may be actuated to effectuate the angular movement of the UAV in the 3D space, causing a dispensing direction of the substance to at least partially counter the wind direction. For example, for a two by two rotor configuration as described above, decreasing (or increasing) the rotation speeds of the motor and the rotor on one side may cause the UAV to title towards the side rotating more slowly. A personal of ordinary skill in the art would appreciate the application of other viable mechanisms to achieve similar results. In FIG. 4E, the drifted spray width and the planned spray width may be substantially similar in length.

Figure 4F:
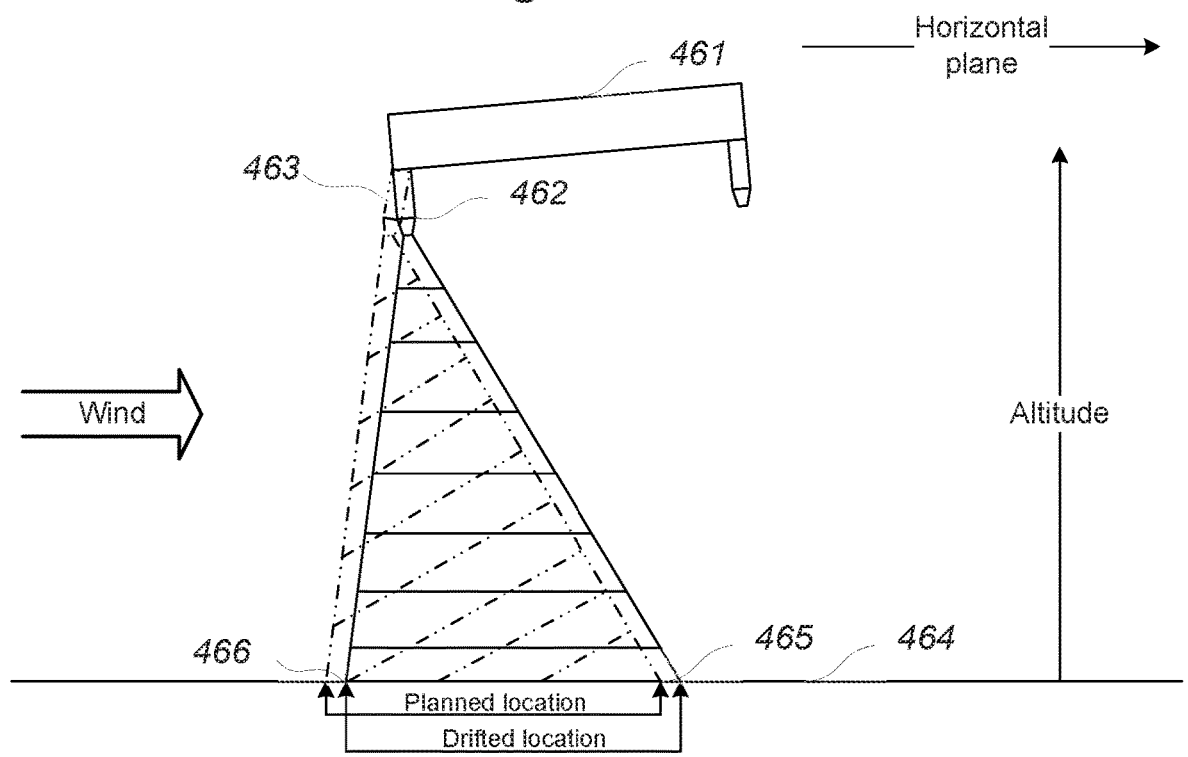

Referring to FIG. 4F, the UAV may actuate one or more components (e.g., the nozzle system, etc.) to cause an angular movement of at least one nozzle relative to the UAV, thus mitigating to the drift caused by the wind. In some embodiments, the UAV 461 may be hovering or flying at an altitude while dispensing the substance from the nozzle 462 toward the ground 464, and the spray width may move from the planned location 466 to the drifted location 465 under the wind influence. Thus, controlling the nozzle to change from a current pose of the nozzle 462 to a pose 463 may cause the spray area to move back to the planned location 466. Here, the pose change of the nozzle may refer to the nozzle's pitch, roll, and/or yaw angle change relative to the UAV. For example, in this figure, the change from the pose 462 to the pose 463 represents a change in the roll angle of the nozzle. The nozzle system (e.g., the actuator 227) may be actuated to effectuate the angular movement of the nozzle, causing a dispensing direction of the substance to at least partially counter the wind direction. For example, the nozzle may be attached to a rotatable structure (e.g., a rotator valve) coupled to a motor, and the motor may be configured to rotate the rotatable structure relative to the UAV. A personal of ordinary skill in the art would appreciate the application of other viable mechanisms to achieve similar results. In FIG. 4F, the drifted spray width and the planned spray width may be substantially similar in length.

Figure 4G:
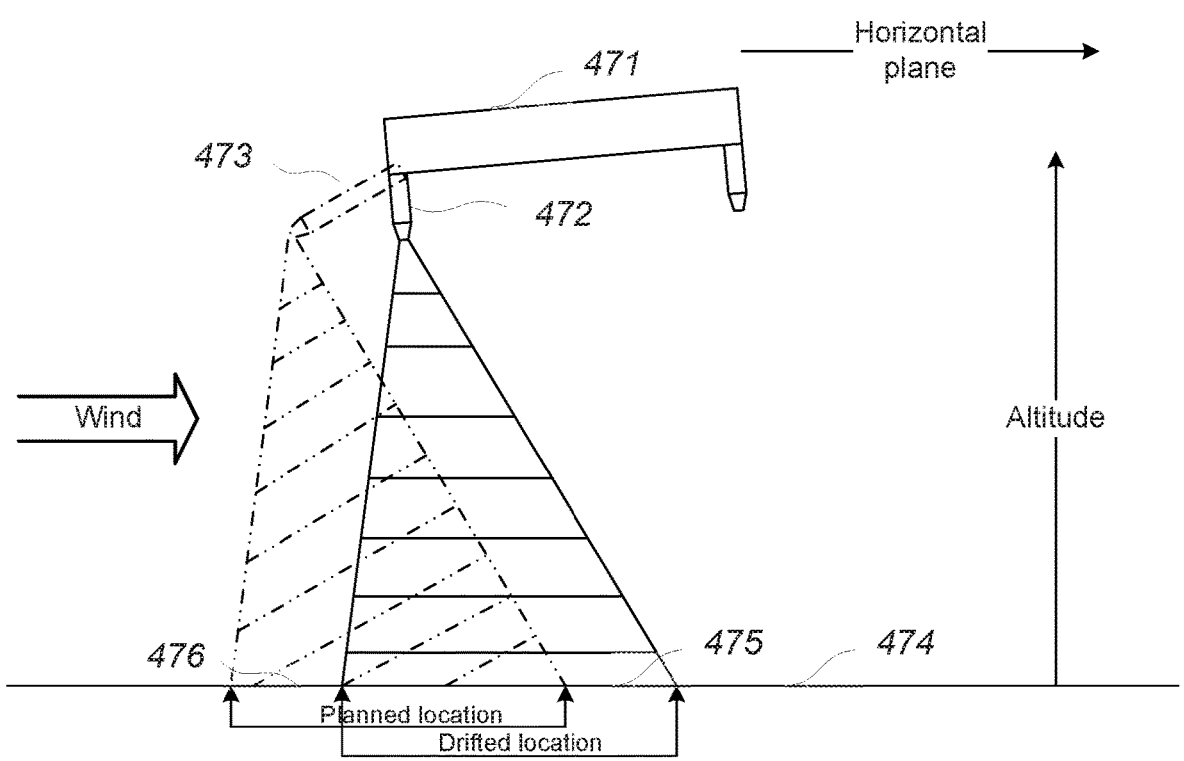

Referring to FIG. 4G, the UAV may actuate one or more components (e.g., the nozzle system, etc.) to cause a linear movement and an angular movement of at least one nozzle, thus mitigating to the drift caused by the wind. FIG. 4G is mostly similar to FIG. 4F, except for additionally extending or retracting the nozzle via the actuator 227. For example, the mechanisms described above with reference to FIGS. 4D and 4F may be combined to achieve such result. In some embodiments, the UAV 471 may be hovering or flying at an altitude while dispensing the substance from the nozzle 472 toward the ground 474, and the spray width may move from the planned location 476 to the drifted location 475 under the wind influence. Thus, controlling the nozzle to change/move from a current spatial disposition of the nozzle 472 to another spatial disposition 473 may cause the spray area to move back to the planned location 476.

In view of FIG. 2A-4G, the wind velocity may be obtained and based on which, the status of the UAV such as its spatial disposition can be changed to counter the wind drift. The wind velocity may be obtained based on the UAV status and various methods. By controlling the UAV's spatial disposition and/or the nozzle's spatial disposition, the effect dispensing origin of the substance can be moved in the 3D space, such that the land position will move back to the planned location. The spatial disposition may include six degrees of freedom, such as an x position, a y position, a z position, a pitch angle, a roll angle, and a yaw angle. A person of ordinary skill in the art would appreciate modifying and/or combining one or more of the disclosed devices and methods to achieve similar results.

FIG. 5 is a flowchart 500 illustrating a method for aerial dispensing, consistent with the exemplary embodiments of the present disclosure. The method 500 may comprise a number of steps, some of which may be optional or may be rearranged in another order. One or more steps of the method 500 may be implemented by one or more components of the system 200 (e.g., the movable object 210 alone, the terminal device 220 alone, a combination of the movable object 210 and the terminal device 220, etc.). At step 501, a wind velocity causing a drift to a substance dispensed from a UAV may be obtained. In some embodiments, as an aerial vehicle dispenses the substance from air, the drift may comprise a horizontal shift from an original landing location of the dispensed substance, and the original landing location may be a landing location of the dispensed substance in a no-wind condition. The original landing position may also be determined from a baseline including a predetermined spatial disposition, a predetermined non-zero wind condition, and/or a predetermined drift. The dispensed substance may comprise at least one of a liquid (e.g., a nutrient, a seed, a pesticide, a herbicide, a liquid fire extinguisher, etc.), a powder (e.g., a powdered fire extinguisher, etc.), or a particle (e.g., a seed, etc.). At step 502, one or more components of the UAV may be actuated based on the obtained wind velocity to cause mitigation to the drift. The step 502 may be performed responsive to determining the drift exceeding a threshold. For example, after performing the step 501, the system 200 may obtain the drift distance as described above with reference to FIGS. 3A and 3B, and determine if the obtained drift distance exceeds a predetermined threshold (e.g., a 5 cm threshold inputted by a user). If the determination is yes, the method 500 may proceed to the step 502 to at least mitigate the drift; otherwise, the system 200 may not implement the mitigation to the drift.

FIG. 6 shows a flow chart 600 illustrating a method for aerial dispensing, consistent with the exemplary embodiments of the present disclosure. The method 600 may comprise a number of steps, some of which may be optional or may be rearranged in another order. One or more steps of the method 600 may be implemented by one or more components of the 200 (e.g., the movable object 210). As shown, step 501 described above may comprise sub-step 601: determining the wind velocity based on comparing a first spatial disposition of the UAV with a second spatial disposition of the UAV, the first spatial disposition being a spatial disposition in a no-wind condition. Further, step 502 described above may comprise sub-step 602: causing a movement of at least one nozzle that dispenses the substance relative to a 3D space, the movement at least partially countering the obtained wind velocity.

In some embodiments, obtaining the wind velocity may comprise determining the wind velocity based on comparing a first spatial disposition of the UAV with a second spatial disposition of the UAV, and the first spatial disposition is a spatial disposition in a no-wind condition. The wind velocity may comprise a wind speed and a wind direction. The spatial disposition of the UAV may comprise a pitch angle and a roll angle of the UAV.

In some embodiments, obtaining the wind velocity may comprise determining the wind velocity based on at least one of a UAV status, a UAV propulsion system status, a user entered parameter, or a wind gauge measurement. For example, the wind velocity may be measured by a wind gauge disposed on the UAV or by a wind gauge disposed outside and independent of the UAV.

In some embodiments, to counter the drift, controlling the one or more components of the UAV based on the obtained wind velocity may cause a movement relative to a 3D space of at least one nozzle that dispenses the substance, such that the movement at least partially counters the obtained wind velocity.

In some embodiments, the movement of the at least one nozzle relative to the 3D space may comprise a linear movement in at least one of a horizontal plane of the 3D space or an altitude in the 3D space. For example, controlling the one or more components of the UAV may comprise controlling a UAV propulsion system (e.g., controlling at least a rotor speed) to cause a linear movement of the UAV relative to the 3D space. For another example, controlling the one or more components of the UAV may comprise controlling a nozzle system (e.g., extending or retracting the nozzle) to cause a linear movement of the at least one nozzle relative to the UAV.

In some embodiments, the movement of the at least one nozzle relative to the 3D space comprises an angular movement, causing a dispensing direction of the substance to at least partially counter a direction of the wind. For example, controlling the one or more components of the UAV may comprise controlling a UAV propulsion system (e.g., controlling at least a rotor speed) to cause change in at least one of a pitch, roll, or yaw angle of the UAV relative to the 3D space. For another example, controlling the one or more components of the UAV may comprise controlling a nozzle system (e.g., controlling at least one of a pitch, roll, or yaw angle of the nozzle relative to the UAV) to cause change in a dispensing direction of the at least one nozzle relative to the UAV.

Systems, apparatuses, non-transitory computer-readable media are also provided that support or implement various methods and techniques of the present disclosure. For instance, one embodiment provides a system for aerial dispensing. The system may comprise a non-transitory computer-readable memory that stores computer-executable instructions, and one or more processors. The one or more processors may be, individually or collectively, configured to access the memory and execute the computer-executable instructions to obtain a wind velocity, the wind causing a drift to a substance dispensed from a UAV, and control one or more components of the UAV based on the obtained wind velocity to cause at least mitigation to the drift.

Another embodiment provides one or more non-transitory computer-readable storage media having stored thereon executable instructions that, when executed by one or more processors of an aerial dispensing system, cause the aerial dispensing system to perform a method. The method may comprise obtaining a wind velocity, the wind causing a drift to a substance dispensed from a UAV, and controlling one or more components of the UAV based on the obtained wind velocity to cause at least mitigation to the drift.

Another embodiment provides an aerial dispensing apparatus. The apparatus may be a UAV. The UAV may comprise a non-transitory computer-readable memory that stores computer-executable instructions, and one or more processors. The one or more processors may be individually or collectively, configured to access the memory and execute the computer-executable instructions to obtain a wind velocity, the wind causing a drift to a substance dispensed from the UAV, and control one or more components of the UAV based on the obtained wind velocity to cause at least mitigation to the drift.

Features of the present disclosure can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present disclosure can be incorporated in software and/or firmware for controlling the hardware of a processing system, and for enabling a processing system to interact with other mechanism utilizing the results of the present disclosure. Such software or firmware may include, but is not limited to, application code, device drivers, operating systems and execution environments/containers.

Features of the disclosure may also be implemented in hardware using, for example, hardware components such as application specific integrated circuits (ASICs) and field-programmable gate array (FPGA) devices. Implementation of the hardware state machine so as to perform the functions described herein will be apparent to persons skilled in the relevant art.

Additionally, the present disclosure may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present disclosure have been described above, it should be understood that they have been presented by way of example, and not limitation. It will be apparent to persons skilled in the relevant art that various changes in form and detail can be made therein without departing from the spirit and scope of the disclosure.

The present disclosure has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the disclosure.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the invention be defined by the following claims and their equivalence. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

What is claimed is:

1. An aerial dispensing method, comprising:
obtaining a wind velocity of a wind that causes a drift to a substance dispensed from an unmanned aerial vehicle (UAV); and
controlling one or more components of the UAV based on the obtained wind velocity to cause at least mitigation to the drift, including:
obtaining a target landing location of the dispensed substance in a no-wind condition;
obtaining a landing location of the dispensed substance from the UAV at a first attitude based on the obtained wind velocity, the landing location being different from the target landing location; and
controlling a UAV propulsion system to cause an angular movement in at least one of a pitch, roll, or yaw angle of the UAV to cause the UAV to rotate to a second attitude to at least partially counter the obtained wind velocity, wherein the dispensed substance from the UAV at the second attitude lands at the target landing location.

2. The aerial dispensing method of claim 1, wherein obtaining the wind velocity comprises determining the wind velocity based on at least one of a UAV status, a UAV propulsion system status, a user entered parameter, or a wind gauge measurement by a wind gauge disposed on the UAV.

3. The aerial dispensing method of claim 1, wherein:
obtaining the wind velocity comprises determining the wind velocity based on comparing a first spatial disposition of the UAV with a second spatial disposition of the UAV; and
the first spatial disposition is predetermined in a no-wind condition or is associated with a predetermined wind condition.

4. The aerial dispensing method of claim 3, wherein the first and second spatial dispositions of the UAV each comprises a pitch angle and a roll angle of the UAV.

5. The aerial dispensing method of claim 1, wherein:
the drift comprises a horizontal shift from the target landing location of the dispensed substance.

6. The aerial dispensing method of claim 1, wherein the dispensed substance comprises at least one of a nutrient, a seed, a pesticide, a herbicide, or a chemical fire extinguisher.

7. The aerial dispensing method of claim 1, wherein the dispensed substance comprises at least one of a liquid, a powder, or a particle.

8. The aerial dispensing method of claim 1, wherein controlling the one or more components of the UAV further comprises at least one of:
controlling the UAV propulsion system to cause a linear movement of the UAV to at least partially counter the obtained wind velocity; or
controlling a nozzle system to cause at least one of a linear movement or a change in dispensing direction of at least one nozzle relative to the UAV, to at least partially counter the obtained wind velocity.

9. The aerial dispensing method of claim 8, wherein controlling the UAV propulsion system comprises controlling at least a rotor speed, causing at least a change in altitude or horizontal position of the UAV.

10. The aerial dispensing method of claim 8, wherein controlling the nozzle system comprises at least one of:
controlling the at least one nozzle to extend or contract; or
controlling at least one of a pitch, roll, or yaw angle of the at least one nozzle relative to the UAV.

11. An unmanned aerial vehicle (UAV), comprising:
a frame;
one or more propulsion systems mounted on the frame;
one or more nozzle systems coupled to at least one of the frame or the one or more propulsion systems and configured to dispense a substance from the UAV; and
one or more controllers coupled to at least one of the one or more propulsion systems or the one or more nozzle systems and configured to:
control at least one of the one or more propulsion systems or the one or more nozzle systems based on a wind velocity, to cause at least mitigation to a drift of the substance from wind, including:
obtaining a target landing location of the dispensed substance in a no-wind condition;
obtaining a landing location of the dispensed substance from the UAV at a first attitude based on the obtained wind velocity, the landing location being different from the target landing location; and
controlling the one or more propulsion systems to cause an angular movement in at least one of a pitch, roll, or yaw angle of the UAV to cause the UAV to rotate to a second attitude to at least partially counter the obtained wind velocity, wherein the dispensed substance from the UAV at the second attitude lands at the target landing location.

12. The UAV of claim 11, wherein the one or more controllers are configured to obtain the wind velocity based on at least one of a UAV status, a UAV propulsion system status, a user entered parameter, or a wind gauge measurement by a wind gauge coupled to the one or more controllers.

13. The UAV of claim 11, wherein:
to obtain the wind velocity, the one or more controllers are configured to compare a first spatial disposition of the UAV with a second spatial disposition of the UAV; and
the first spatial disposition is predetermined in a no-wind condition or is associated with a predetermined wind condition.

14. The UAV of claim 13, wherein the first and second spatial dispositions of the UAV each comprises a pitch angle and a roll angle of the UAV.

15. The UAV of claim 11, wherein:
the drift comprises a horizontal shift from the target landing location of the dispensed substance.

16. The UAV of claim 11, wherein the dispensed substance comprises at least one of a nutrient, a seed, a pesticide, a herbicide, or a chemical fire extinguisher.

17. The UAV of claim 11, wherein the dispensed substance comprises at least one of a liquid, a powder, or a particle.

18. The UAV of claim 11, wherein to control at least one of the propulsion systems or the nozzle systems based on the wind velocity, the one or more controllers are further configured to perform at least one of:
controlling the one or more propulsion systems to cause a linear movement of the UAV to at least partially counter the wind velocity; or
controlling the one or more nozzle systems to cause at least one of a linear movement or a change in dispensing direction of at least one nozzle relative to the UAV, to at least partially counter the obtained wind velocity.

19. The UAV of claim 18, wherein to control the one or more propulsion systems, the one or more controllers are configured to control at least a rotor speed, causing at least a change in altitude or horizontal position of the UAV.

20. The UAV of claim 18, wherein to control the one or more nozzle systems, the one or more controllers are configured to perform at least one of:
controlling the at least one nozzle to extend or contract; or
controlling at least one of a pitch, roll, or yaw angle of the at least one nozzle relative to the UAV.

\* \* \* \* \*